United States Patent
Shioji et al.

(10) Patent No.: US 7,394,496 B2
(45) Date of Patent: Jul. 1, 2008

(54) DIGITAL CAMERA CAPABLE OF IMAGE PROCESSING

(75) Inventors: Masahiro Shioji, Neyagawa (JP); Toru Asaeda, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 11/401,419

(22) Filed: Apr. 11, 2006

(65) Prior Publication Data

US 2006/0181630 A1    Aug. 17, 2006

Related U.S. Application Data

(63) Continuation of application No. 09/267,398, filed on Mar. 15, 1999, now Pat. No. 7,057,658.

(30) Foreign Application Priority Data

| Mar. 16, 1998 | (JP) | ................................. 10-065051 |
| Apr. 24, 1998 | (JP) | ................................. 10-114909 |
| May 7, 1998 | (JP) | ................................. 10-125089 |

(51) Int. Cl.
    *H04N 5/222* (2006.01)
    *H04N 5/262* (2006.01)
(52) U.S. Cl. .................. 348/333.11; 348/239
(58) Field of Classification Search ............ 348/333.03, 348/333.11, 240.2, 239, 231.3, 231.6, 240.99, 348/240.1; 715/520, 726, 798, 800, 801
    See application file for complete search history.

(56) References Cited

U.S. PATENT DOCUMENTS

| 4,517,658 A | * | 5/1985 | Iida ............................ 715/520 |
| 5,146,334 A | | 9/1992 | Fukatsu et al. .............. 358/183 |
| 5,262,856 A | | 11/1993 | Lippman et al. ............ 358/136 |
| 5,274,453 A | | 12/1993 | Maeda ........................ 348/584 |
| 5,301,026 A | | 4/1994 | Lee ............................. 348/584 |

(Continued)

FOREIGN PATENT DOCUMENTS

EP    0 853 426 A2    7/1998

(Continued)

*Primary Examiner*—Lin Ye
*Assistant Examiner*—Jason Whipkey
(74) *Attorney, Agent, or Firm*—Kratz, Quintos & Hanson, LLP

(57) ABSTRACT

In a digital camera, when a motion image reducing mode is set, a pointer is displayed on a monitor. When the operator operates on cursor key, the pointer moves, and when the operator operates a determination key at two different pointer positions, a rectangular frame is formed. Namely, the two pointer positions represent upper left and lower right coordinates of the frame. The picked up real time motion image is displayed in the rectangular frame. The displayed motion image is reduced to a magnification corresponding to the ratio of the rectangular frame with respect to the monitor frame. When the operator operates a shutter button at this time, the image in the motion image frame is recorded on a memory card. As the motion image is displayed in the motion image frame in accordance with the instruction by the operator and the image in the motion image frame is recorded in accordance with the operation of the shutter button, a processed image can be obtained without the necessity of preparing a separate image processing apparatus.

9 Claims, 21 Drawing Sheets

U.S. PATENT DOCUMENTS

| | | | |
|---|---|---|---|
| 5,477,264 A | 12/1995 | Sarbadhikari et al. | 348/231.6 |
| 5,689,300 A | 11/1997 | Shibata et al. | 348/373 |
| 5,710,954 A | 1/1998 | Inoue | |
| 5,732,186 A | 3/1998 | Yasumura et al. | 348/239 |
| 5,905,530 A | 5/1999 | Yokota et al. | 348/240.99 |
| 5,963,204 A * | 10/1999 | Ikeda et al. | 348/335 |
| 6,266,085 B1 | 7/2001 | Kato et al. | 348/333.05 |
| 6,359,649 B1 | 3/2002 | Suzuki | 348/333.11 |
| 6,621,524 B1 | 9/2003 | Iijima et al. | |
| 6,657,658 B2 * | 12/2003 | Takemura | 348/333.02 |
| 2002/0047910 A1 | 4/2002 | Motoi | 348/239 |

FOREIGN PATENT DOCUMENTS

| | | |
|---|---|---|
| JP | 64-14675 | 1/1989 |
| JP | 2-22967 | 1/1990 |
| JP | 2-130179 | 10/1990 |
| JP | 3-22679 | 1/1991 |
| JP | 3-42979 | 2/1991 |
| JP | 4-68680 | 3/1992 |
| JP | 4-286475 | 10/1992 |
| JP | 05089214 A * | 4/1993 |
| JP | 6-6712 | 1/1994 |
| JP | 6-334960 | 12/1994 |
| JP | 8-88784 | 4/1996 |
| JP | 10-93912 | 4/1998 |
| JP | 10-174031 | 6/1998 |

* cited by examiner

THROUGH IMAGE DISPLAY

SETTING OF RECORDING CONDITION

REPRODUCED IMAGE DISPLAY

FUNCTION SELECTION

FIRST POINT DESIGNATION

SECOND POINT DESIGNATION

FRAME POSITION ADJUSTMENT

THROUGH IMAGE DISPLAY · PICKUP

DIGITAL CAMERA CAPABLE OF IMAGE PROCESSING

This application is a continuation of prior application Ser. No. 09/267,398 filed on Mar. 15, 1999, now U.S. Pat. No. 7,057,658 which is based upon and claims the benefit of priority from prior Japanese Patent Application Nos. 10-065051 filed on Mar. 16, 1998; 10-114909 filed on Apr. 24, 1998; and 10-125089 filed on May 7, 1998, the entire contents of which are incorporated herein by reference.

BACKGROUND OF THE INVENTION

1. Field of the Invention

The present invention relates to a digital camera and, more specifically, to a digital camera in which a picked up motion image or a reproduced still image is displayed on a monitor.

2. Description of the Background Art

In a conventional digital camera of this type, an image recorded on a recording medium is reproduced and displayed on a built in monitor.

The prior art digital camera, however, is capable of simple reproduction of the recorded image, and in order to process the recorded image, a separate image processing apparatus has been necessary.

SUMMARY OF THE INVENTION

Therefore, an object of the present invention is to provide a digital camera capable of image processing without the necessity of preparing a separate image processing apparatus.

According to an aspect, the present invention includes an image pickup section for picking up an image of an object, a first forming section responsive to a motion image frame forming instruction of an operator for forming a motion image frame smaller than a monitor frame on a monitor, and a motion image display section for displaying the motion image of the object picked up by the image pickup section on the motion image frame.

Therefore, a motion image is displayed on a desired frame formed on the monitor in accordance with the frame forming instruction by the operator, and hence a processed image can be obtained without the necessity of preparing a separate image processing apparatus.

According to another aspect, the present invention provides a digital camera in which a first still image corresponding to the monitor frame is reproduced from a recording medium and displayed on the monitor, which includes a second still image reproducing section responsive to a synthesization instruction from the operator for reproducing a second still image smaller than the monitor frame from the recording medium, and a synthesizing section for synthesizing the second and the first still images.

Therefore, the second still image smaller than the monitor frame is synthesized with the first still image in response to the synthesization instruction by the operator, and therefore a processed image can be obtained without the necessity of preparing the image processing apparatus.

According to a still further aspect, the present invention includes a setting section for setting a through image display area (an image of the object seen through) at a portion of the displayed reproduced image, an image synthesizing section for generating a synthesized image by displaying the through image on the set area, and a recording section for recording the generated synthesized image. Therefore, the reproduced image and the through image can be synthesized in a simple manner by a digital camera by itself, and a processed image can be obtained without the necessity of preparing an image processing apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1A:
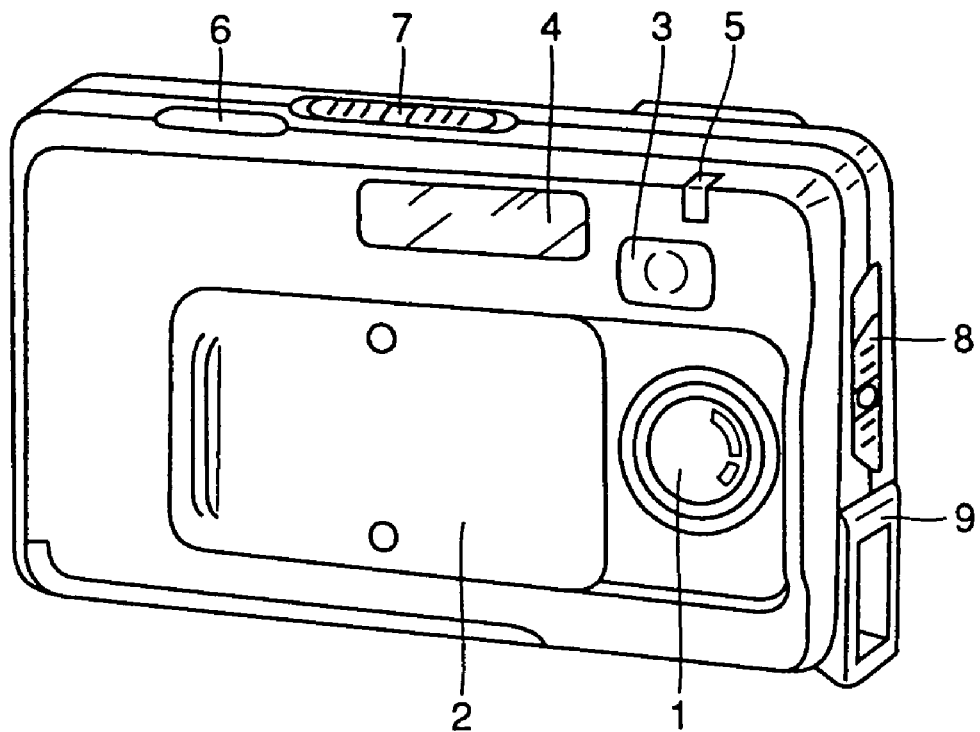
FIGS. 1A and 1B are perspective views showing appearance of the digital camera in accordance with a first embodiment of the present invention.
Figure 1B:
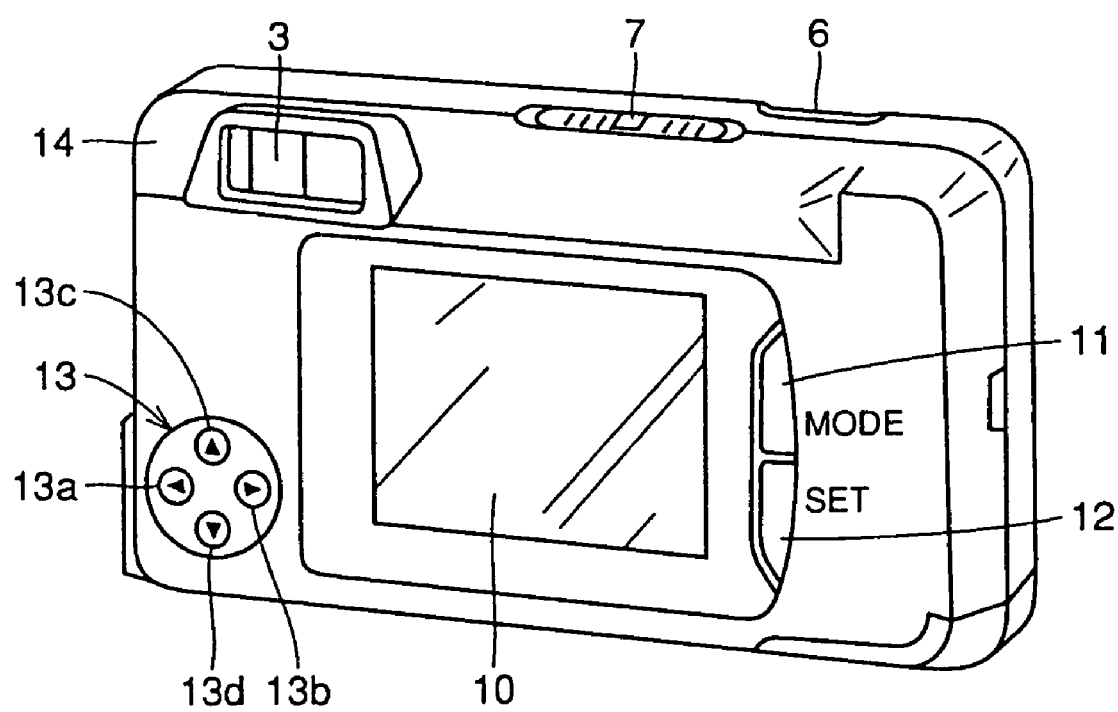

FIG. 1A is a perspective view taken from the front side (from the side of the lens) and FIG. 1B is a perspective view taken from the rear side, showing the appearance of the digital camera in accordance with the first embodiment of the present invention.

Referring to FIGS. 1A and 1B, on the front side of the digital camera, there are provided a lens 1, a lens cover 2 linked to a power switch, an optical finder 3, a flashlight 4 and an LED (Light Emitting Diode) 5 for a self timer, and on the upper and side surfaces, there are a shutter button 6, a three point type main switch 7, a macro switch lever 8 and a terminal 9. On the rear surface of the digital camera, there are provided an LCD (Liquid Crystal Display) 10, a mode button 11, a set button 12, a direction designating button 13 and a microphone 14.

Main switch 7 is used for switching among three modes, that is, an image pickup mode with LCD 10 on, an image pickup mode with LCD 10 off, and a reproduction mode. In the image pickup mode with LCD 10 on, a through image is displayed on LCD 10 and the through image is recorded. In the image pickup mode with LCD 10 off, image is picked up using optical finder 3 in the similar manner as the conventional camera using silver film. In the reproduction mode, LCD 10 is turned on and a reproduced image is displayed on LCD 10. On LCD 10, in addition to the through image and the reproduced image, various icons (characters) representing recording condition, reproduction function and so on are also displayed.

By pressing lightly each of left, right, up and down direction designating sections 13a, 13b, 13c and 13d of direction designating button 13, feeding/reversing of the reproduced image, setting of recording condition, selection of reproduction function and so on can be set.

Figure 2:
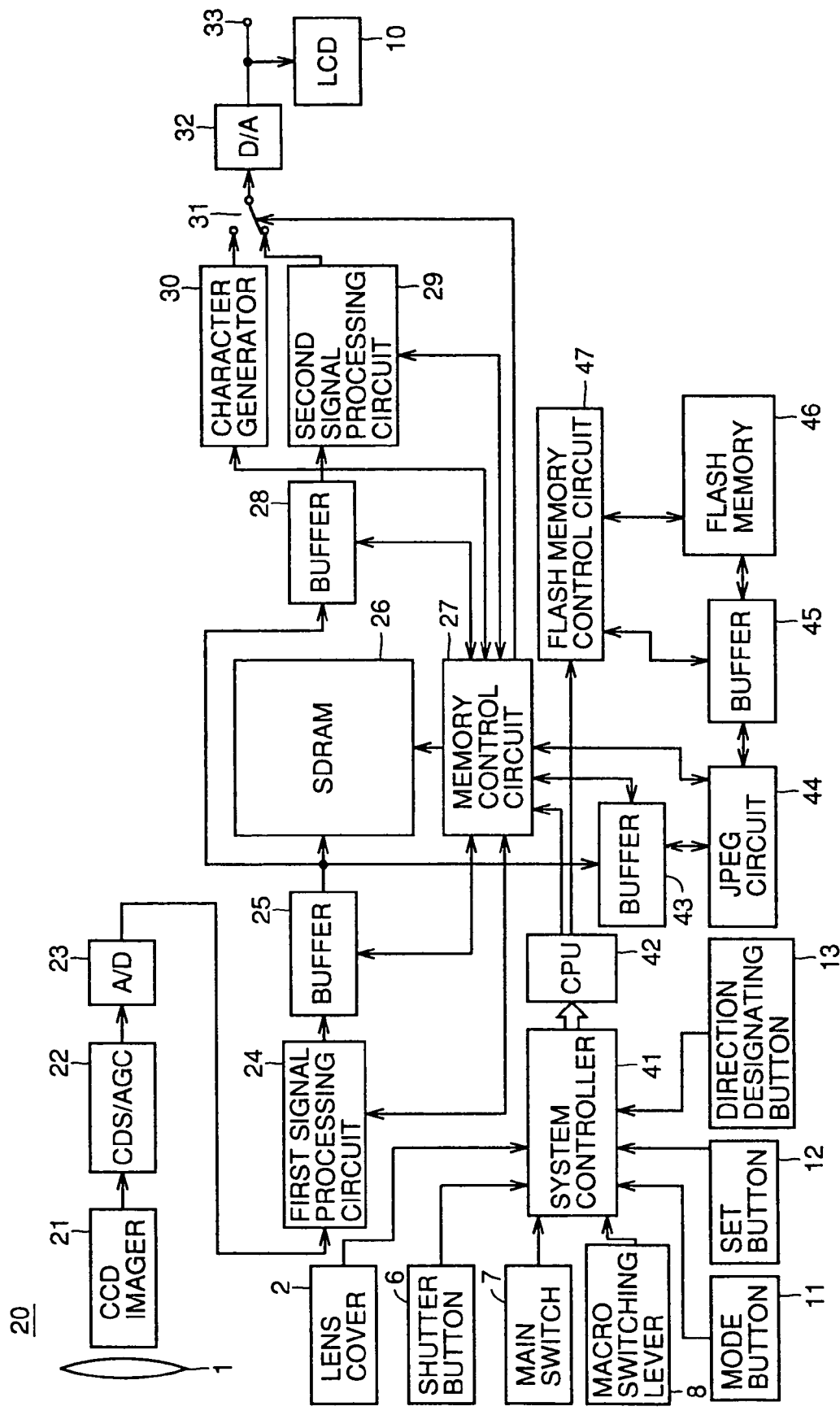
FIG. 2 is a block diagram showing configuration of an image recording and reproducing circuit contained in the digital camera shown in FIGS. 1A and 1B.

FIG. 2 is a block diagram representing a configuration of an image recording and reproducing circuit 20 contained in the digital camera.

Referring to FIG. 2, in image recording and reproducing circuit 20, a system controller 41 applies various control signals to a CPU (Central Processing Unit) 42 at prescribed timings, in response to signals from lens cover 2, shutter button 6, main switch 7, macro switch lever 8, mode button 11, set button 12 and direction designating button 13. In accordance with the control signals applied from system controller 41, CPU 42 controls a memory control circuit 27 and a flash memory control circuit 47.

Memory control circuit 27 controls a first signal processing circuit 24, a second signal processing circuit 29, a JPEG (Joint Photographic Expert Group) circuit 44, buffers 25, 28, 43 and an SDRAM (Synchronous Dynamic random Access Memory) 26. Write/read of image data to and from SDRAM 26 are performed through buffers 25, 28 and 43. As the speed of transfer between buffers 25, 28 and 43 and SDRAM 26 (write/read) is made faster than the speed of data transfer among buffers 25, 28, 43, the first signal processing circuit 24, the second signal processing circuit 29 and JPEG circuit 44, the circuit 24, 29 and 44 can operate almost simultaneously.

Memory control circuit 27 controls a character generator 30 and a switch 31 so that a part of image data is replaced with a character image data, whereby a character image is overwritten on the through image or the reproduced image.

Flash memory control circuit 47 controls buffer 45 and flash memory 46, writes image data compressed by JPEG circuit 44 to flash memory 46 through buffer 45, and applies data read from flash memory 46 to JPEG circuit 44 through buffer 45.

In the image pickup mode, an optical image entering through lens 1 is incident on a CCD (Charge Coupled Device) imager 21 through a complementary color filter, not shown. CCD imager 21 outputs electric signals (progressive scan signals) of pixels in accordance with progressive scanning (progressive scanning of pixels). The progressive scan signals from CCD imager 21 is applied to a CDS/AGC (Correlate Double Sampling/Auto Gain Control) circuit 22.

CDS/AGC circuit performs known noise removal and level adjustment on the progressive scan signals, and the progressive scan signals which have been subjected to such processings are converted to digital data (image data) by A/D converter 23. First signal processing circuit 24 performs known white balance adjustment and gamma correction on the image data output from A/D converter 23, and thereafter, applies the image data to SDRAM 26 through buffer 25.

Memory control circuit 27 writes the image data to SDRAM 26, and thereafter reads the image data by interlace scanning. Therefore, odd-numbered field image data and even-numbered field image data are output alternately from SDRAM 26. The image data output from SDRAM 26 are input to second signal processing circuit 29 through buffer 28 and to JPG circuit 44 through buffer 43.

Figure 3A:
FIGS. 3A and 3B are illustrations representing image pickup modes of the digital camera shown in FIGS. 1A and 1B.

The second signal processing circuit 29 performs processing such as color interpolation on the input image data, and image data output from second signal processing circuit 29 are applied to D/A converter 32 through switch 31. D/A converter 32 converts the image data to analog signals (image signals), which image signals are output through an output terminal 33 and applied to LCD 10. Therefore, real time motion image (through image) 50 is displayed on LCD 10, as shown in FIG. 3A.

Figure 3B:
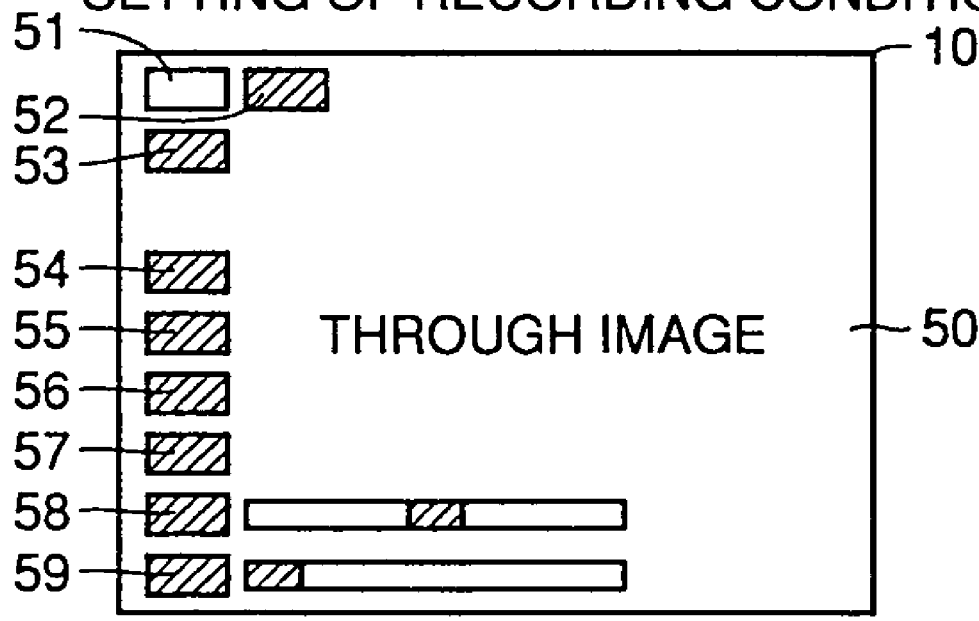

When mode button 11 is pressed in this state, various icons 51 to 59 indicating the recording condition are displayed on an end portion of LCD 10. In FIG. 3B, the icons are represented as a simple white rectangle and hatched rectangles, for simplicity of the drawing. Actually, the icons are marks representing corresponding recording conditions. Icons 51 to 59 are for setting a still image pickup mode, high speed continuous image pickup mode, resolution, voice memo, self timer, macro mode display, exposure correction and digital zooming. Icons 51 to 59 are selected by direction designating button 13. Among icons 51 to 59, the selected icon (in the figure, icon 51) is displayed in a positive state (white rectangle) and other icons are displayed in a negative state (hatched rectangles). When set button 12 is pressed in this state, the condition represented by the selected icon (in this case, icon 51) is set (in this case, still image pickup mode). When mode button 11 is pressed after the setting of recording conditions, icons 51 to 59 disappear and the display returns to the state of FIG. 3A.

When an operator presses a shutter button 6, JPEG circuit 44 is activated, image data read from SDRAM 26 and input to JPEG circuit 44 through buffer 43 are compressed in accordance with a JPEG format, and the compressed data is written to flash memory 46 through buffer 45. In a reproduction mode, the compressed data read from flash memory 46 is input to JPEG circuit 44 through buffer 45. JPEG circuit 44 decompresses the input compressed data and applies the data to SDRAM 26 through buffer 43. Memory control circuit 27 writes the image data to SDRAM 26, and thereafter, read the image data by interlace scanning.

Figure 4A:
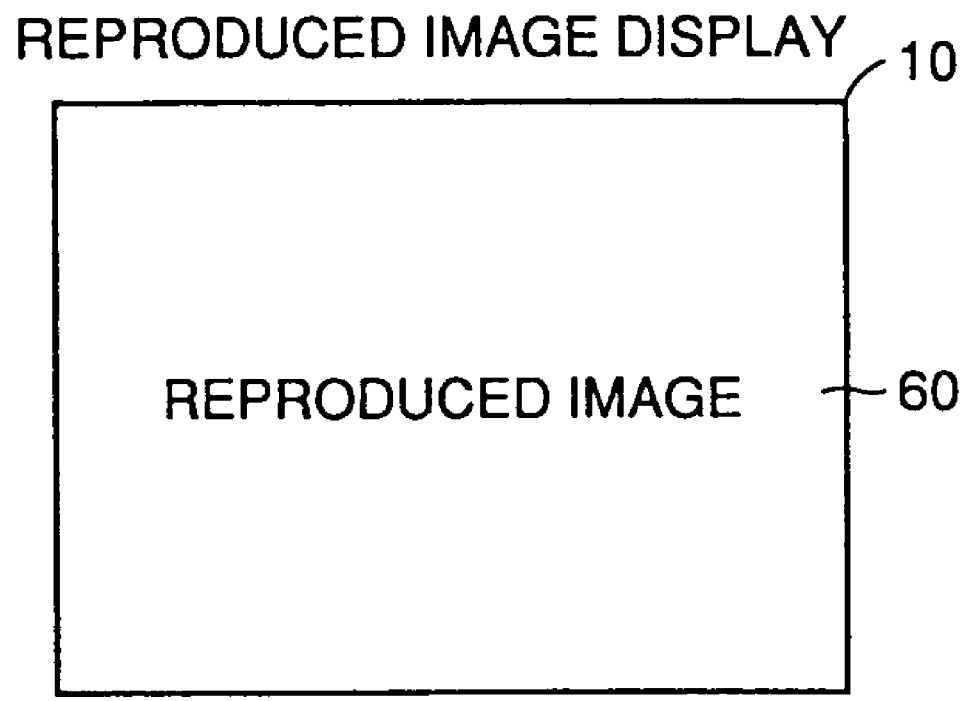
FIGS. 4A and 4B are illustrations representing the reproduction mode of the digital camera shown in FIGS. 1A and 1B.

The image data read from SDRAM 26 are applied through buffer 28, second signal processing circuit 29 and switch 31 to D/A converter 32 and converted to analog image signals. The analog image signals are output to the outside through output terminal 33 and to LCD 10. Thus as shown in FIG. 4A, reproduced image 60 is displayed on LCD 10. When left direction designating section 13a of direction designating button 13 is pressed, an image recorded prior to the reproduced image is reproduced, and when the right direction designating seciton1 3b is pressed, an image recorded after the reproduced image is reproduced. In this manner, a desired image can be selected and reproduced.

Figure 4B:
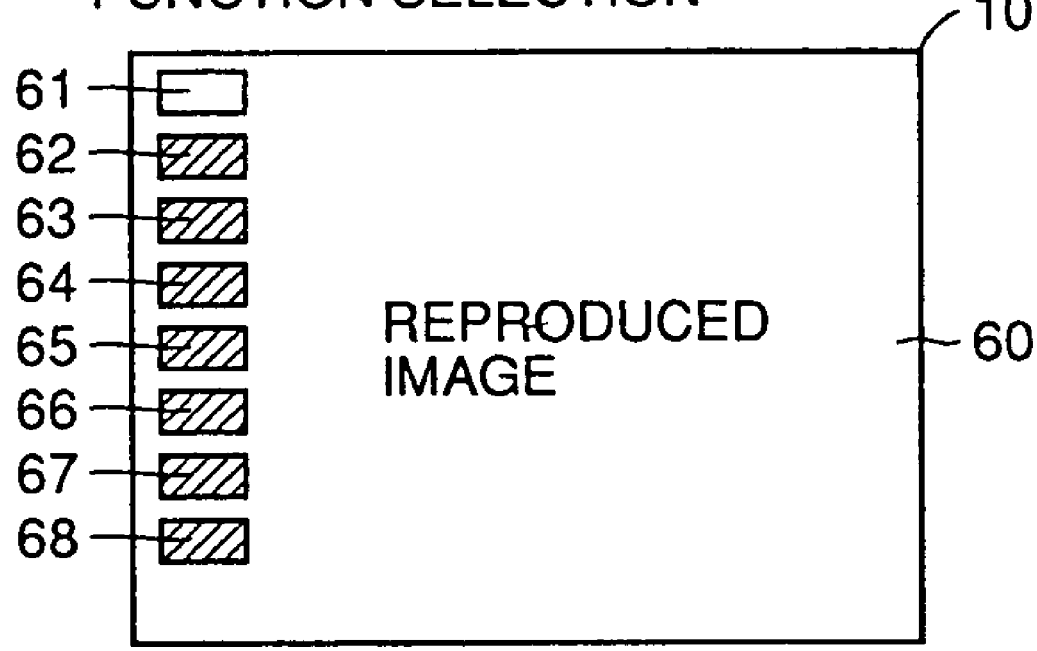

When mode button 11 is pressed in this state, various icons 61 to 68 representing reproducing functions are displayed on an end portion of LCD 10 as shown in FIG. 4B. Icons 61 to 68 are for selecting reproduction mode, multireproduction, reproduction zooming, protection, erasure, image synthesization, card operation and setting of date and time, respectively. A desired one of icons 61 to 68 is selected by direction designating button 13 and when set button 12 is pressed, the function represented by the icon is selected. When mode button 11 is pressed without pressing set button 12, the display returns to the state of FIG. 4A.

The image synthesizing function, which is the feature of the present invention, will be described. First, in the state shown in FIG. 4A, direction designating button 13 is used to feed/reverse the reproduced image, and a desired reproduced image 60 as a background is selected. Thereafter, mode button 11 is pressed so that icons 61 to 68 are displayed as shown in FIG. 4B, icon 66 for image synthesization is selected by using direction designating button 13, and set button 12 is pressed.

Figure 5A:
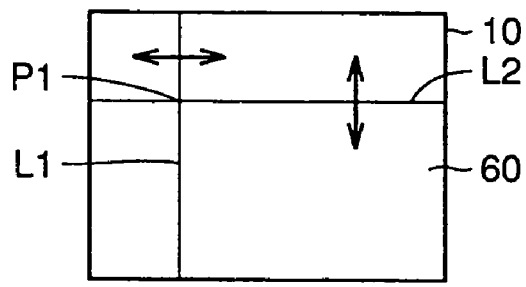
FIGS. 5A to 5D are illustrations representing the image synthesizing function of the digital camera shown in FIGS. 1A and 1B.

In this manner, image synthesizing function is selected, and a vertical line L1 and a horizontal line L2 are displayed on reproduced image 60 as shown in FIG. 5A. When the left direction designating section 13A or the right direction designation section 13b of direction designating button 13 is pressed, the vertical line L1 moves to the left or the right, and when the upper direction designating section 13c or the lower direction designating section 13d is pressed, the horizontal line L2 moves upward or downward. By moving the vertical line L1 and the horizontal line L2, position of a first point P1 which is an intersecting point of these lines is determined. The first point P1 is an upper left point of a frame F.

Figure 5B:
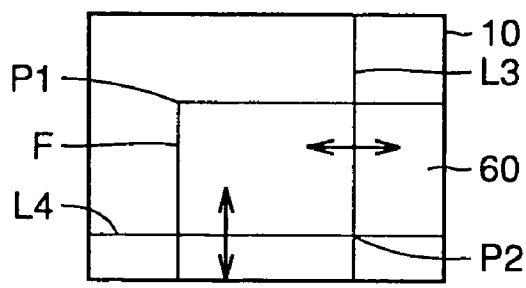

When set button 12 is pressed in this state, the first point P1 is determined as shown in FIG. 5B, and a vertical line L3 and a horizontal line L4 are further displayed on reproduced image 60. When the left direction designating section 13a or the right direction designating section 13b of direction designating button 13 is pressed, the vertical line L3 moves to the left or to the right, and when the upper direction designating section 13c or the lower direction designating section 13d is pressed, the horizontal line L4 moves upward or downward. The vertical line L3 and the horizontal line L4 are movable on the lower side and to the right of the first point P1. When one of the vertical line L3 and the horizontal line L4 is moved, the other of the vertical line L3 and the horizontal line L4 follows such that the aspect ratio of the frame F having L1 to L4 as its four sides is always kept at 3:4. By moving vertical line L3 and horizontal line L4, the position of the second point P2 which is an intersection of these lines is determined. The second point B2 is the lower right point of frame F.

Figure 5C:
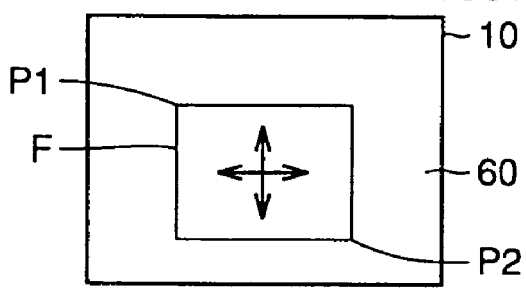

When set button 12 is pressed in this state, the size and approximate position of frame F is determined as shown in FIG. 5C. When the direction designating section 13a to 13d of direction designating button 13 is pressed, the frame F moves in the designated direction. By moving the frame F, the position of the frame F is determined.

Figure 5D:
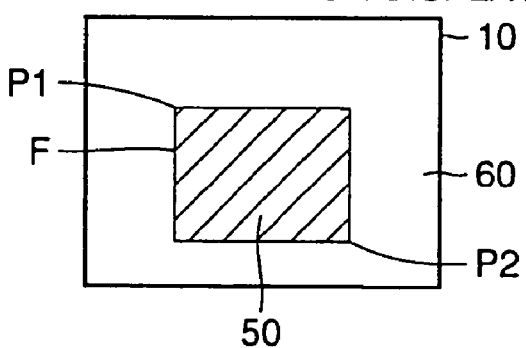

When set button 12 is pressed in this state, a through image 50 is displayed in an area surrounded by the frame F, as shown in FIG. 5D. At this time, in the circuit 20 shown in FIG. 2, the through image data generated by A/D converter 23 is thinned out, that is, subjected to a so called reduction zooming, by the first signal processing circuit 24 conforming to the size and position of the frame F. The thinned out through image data are applied to SDRAM 26 through buffer 25, and overwritten on that area of the reproduced still image data written in SDRAM 26 which corresponds to the area surrounded by the frame F. As the through image is a motion image, the overwriting data is successively updated. In this manner, a window of a desired size and position is opened in the reproduced image 60, and through image 50 is displayed on the window.

When shutter button 6 is pressed in this state, the image data of the synthesized image displayed on the LCD 10 at that time are compressed by JPEG circuit 44 and written to flash memory 46 through buffer 45. Therefore, it becomes possible to reproduce the synthesized image in the similar manner as the still image picked up in the normal image pickup mode.

When mode button 11 is pressed in the state represented by FIGS. 5A to 5D, the display returns to the state of FIG. 5A, and when mode button 11 is pressed again in this state, the display returns to the state of FIG. 3B.

In the present embodiment, the thinned out through image data are overwritten on the reproduced image data at the time of image synthesization to produce a synthesized image. However, the embodiment is not limited thereto. For example, all the through image data and the reproduced image data may be separately written to memory areas of SDRAM 26, the reproduced image data may be read outside the frame F and the through the image data may be read inside the frame F, to produce the synthesized image.

Further, the vertical line L3 and the horizontal line L4 are moved with the aspect ratio of the frame F having L1 to L4 as four sides is always kept at 3:4 in the above described embodiment. However, the ratio is not limited, and the position of the second point P2 may be set regardless of the ratio of 3:4.

FIGS. 6A to 6F represent a modification of the first embodiment.

Figure 6A:
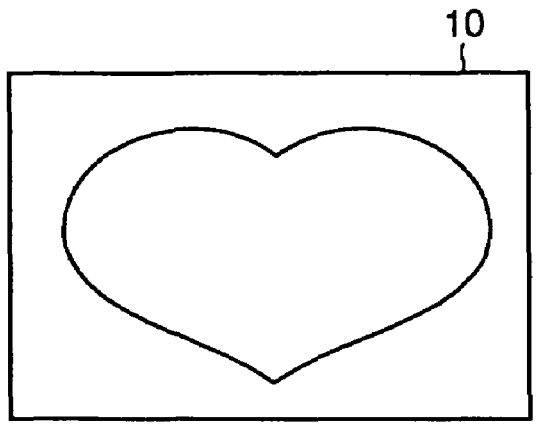
FIGS. 6A to 6F represent a modification of the first embodiment.
Figure 6B:
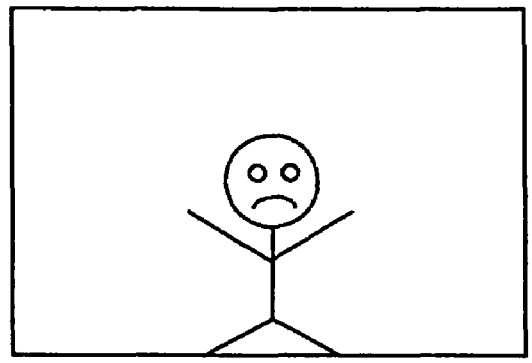

FIG. 6A shows a reproduced image displayed on LCD 10, and FIG. 6B shows the through image. In the embodiment described above, when set button 12 is pressed after the position of frame F is determined, through image 50 which has been thinned out and reduced in size is displayed in the area surrounded by frame F as shown in FIG. 6D.

Figure 6C:
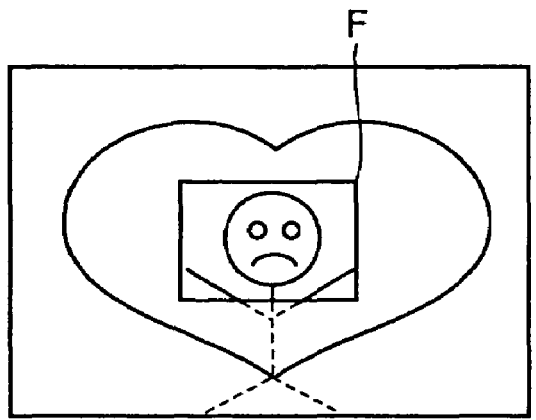
Figure 6D:
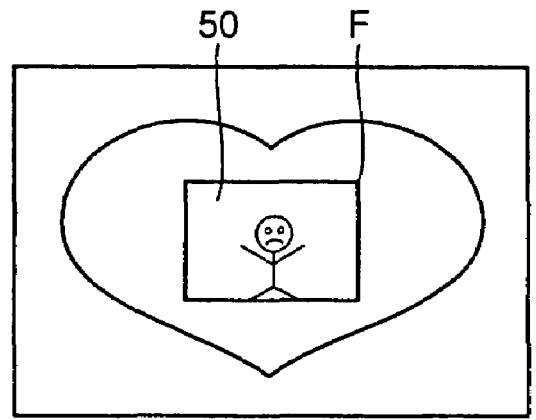

By contrast, in this modification, when set button 12 is pressed continuously, only a part of the through image corresponding to the frame extracted from the whole image is displayed as shown in FIG. 6C, without thinning out as shown in FIG. 6D.

Figure 6E:
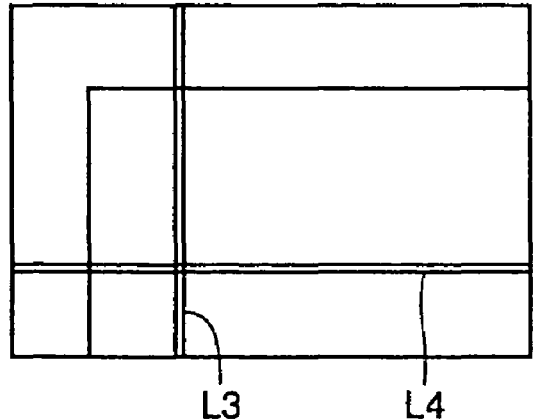
Figure 6F:
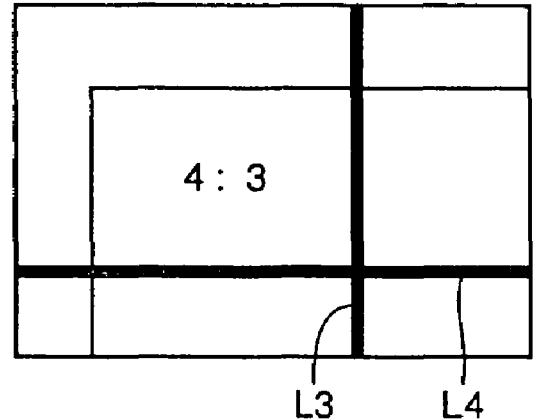

Further, when the position of the first point P1 is determined by moving the vertical line L1 and the horizontal line L2, the color of the vertical and horizontal lines L1 and L2 may be changed from white to orange, for example, and when the aspect ratio of frame F is set at 3:4 by moving the vertical line L3 and the horizontal line L4, the color of the vertical and horizontal lines L3 and L4, represented by the double lines in FIG. 6E, may be changed from white to green, for example, as represented by a thick black line in FIG. 6F.

Second Embodiment

In the present embodiment, when a motion image reducing mode is set, a pointer is displayed on the monitor. When the operator operates a cursor key, the pointer moves, and when the operator operates a determination key at two different pointer positions, a rectangular frame is formed. More specifically, the two pointer positions present the upper left and lower right coordinates of the frame. The picked up real time motion image is displayed in the rectangular frame. The displayed motion image is reduced to a magnification corresponding to the ratio of the rectangular frame with respect to the monitor frame. In the portion of the monitor frame outside the rectangular frame, a still image reproduced from the recording medium may be displayed. When the operator operates the shutter button in this state, the image in the monitor frame is recorded on the recording medium.

Further, when a still image paste mode is set with the reproduced still image being displayed on the monitor, a partial still image recorded separately is synthesized with the still image which is displayed originally. When the cursor key is operated in the upward/downward direction, display of the partial still image is switched, and when the cursor key is operated in the left/write direction, the still image displayed below the partial image is switched. When the shutter button is operated, the synthesized image which is being displayed is recorded on the recording medium.

This embodiment will be described in detail with reference to the figures.

Figure 7:
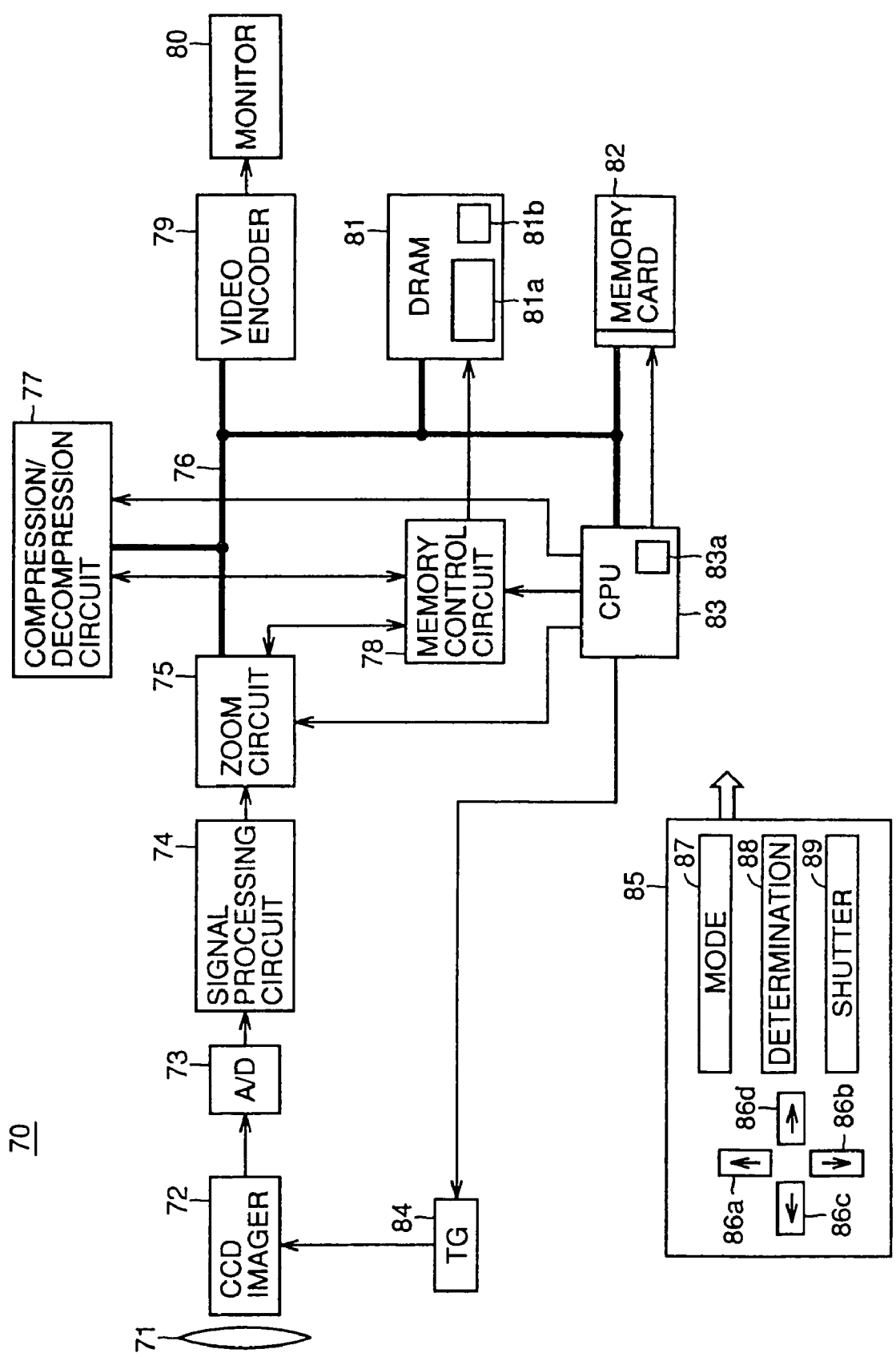
FIG. 7 is a block diagram representing a configuration of an image recording and reproducing circuit contained in the digital camera in accordance with a second embodiment of the present invention.

Referring to FIG. 7, the digital camera 70 in accordance with the present embodiment includes a lens 71. An incident optical image of the object enters CCD imager 72 through lens 71. CCD imager 72 has 640 pixels and 480 lines of pixels in the horizontal and vertical directions.

When a mode setting switch 87 is set to the side of the camera, a system controller 85 sets camera mode in CPU 83 through an interruption terminal 83. At this time, CPU 83 designates reading of pixel signals (camera signals) to timing generator 84, and timing generator 84 reads camera signals in ruster scan method, from CCD imager 72. The read camera signals are converted to digital signals (camera data) by an A/D converter 73, and the converted camera data are input to a signal processing circuit 74. In front of CCD imager 72, a complementary color filter, not shown, is attached, and pixels of the input camera data each has only one complementary color component of Ye, Cy, Mg or G. Therefore, signal processing circuit 74 performs color separation on the input camera data, and RGB data obtained through color separation are subjected to YUV conversion.

The YUV data obtained in this manner, that is, the image data is subjected to a prescribed zooming process by a zoom circuit 75, input to DRAM 81 through a bus 76 and written to a video memory area 81a in accordance with ruster scan method. Video area 81a has a capacity corresponding to a frame of monitor 80 (monitor frame), and image data output from zoom circuit 75 are written to the video memory area 81 by DMA (Direct Memory Access). More specifically, CPU 83 applies, together with a write request, the frame data, that is, the X and Y coordinates at the upper left corner of the frame as well as the data of horizontal and vertical sizes (X size and Y size) to memory control circuit 78, and in accordance with the frame data, memory control circuit 78 writes the image data at a prescribed position of video memory area 81a. In the normal camera mode, frame data of the monitor frame are input to memory control circuit 78. The upper left coordinates of the monitor frame are (0, 0), and the horizontal and vertical sizes are 640 pixels and 480 lines, respectively. Therefore, image data are written in the full video memory area 81a.

After the completion of writing, the image data of video memory area 81a are read in accordance with the ruster scan method by memory control circuit 78, and applied to a video encoder 79 through a bus 76. Video encoder 79 encodes the input image data in accordance with NTSC method, and the resulting composite video signals are output to monitor 80 which also serves as a view finder. The motion picture picked up by CCD imager 72 is displayed fully on the monitor frame. A buffer, not shown, is provided at an input/output port of DRAM 81, and transfer rate of the image data is converted. Therefore, writing and reading of image data can be executed in parallel.

When the operator operates the shutter button 89 in the normal camera mode, CPU 83 instructs timing generator 84 to stop reading of charges. Thus new reading of image data from CCD imager 72 is stopped, and image data at the time point when shutter button 89 is pressed is kept maintained in video memory area 81. CPU 83 reads the image data from video memory area 81a by DMA, and inputs the data to a compression/decompression circuit 77 through a bus 76. At the same time, CPU 83 applies a compression instruction to compression/decompression circuit 77. Compression/decompression circuit 77 compresses the input image data in accordance with the JPEG method, stores the compressed image data in an image file, and applies the image file to a memory card 82. To memory card 82, a write instruction is also applied from CPU 83, and the image file output from compression/decompression circuit 87 is recorded on memory card 82.

When the operator sets the mode setting switch 87 to the reproducing side, system controller 85 sets CPU 83 in the reproduction mode. In response, CPU 83 reproduces a desired image file from memory card 82, and applies the image file to compression/decompression circuit 77 through bus 76. A decompression instruction from CPU 83 is also applied to compression/decompression circuit 77. Compression/decompression circuit 77 decompresses the image data of the input image file in accordance with the JPEG method, and inputs the decompressed image data, that is, the reproduced image data to DRAM 81. In order to write the reproduced image data to video memory area 81a, a write request is applied from compression/decompression circuit 77 to memory control circuit 78, and frame data defining the position of writing is applied from CPU 83 to memory control circuit 78.

In accordance with the write request and the frame data, memory control circuit 78 writes the reproduced image data to video memory area 81a. When writing is completed, CPU 83 inputs the same frame data and a read request to memory control circuit 78 and, in response, memory control circuit 78 reads the reproduced image data from video memory area 81a. The read reproduced image data is applied to video encoder 79 and, finally, the reproduced still image is displayed on monitor 80.

Figure 8:
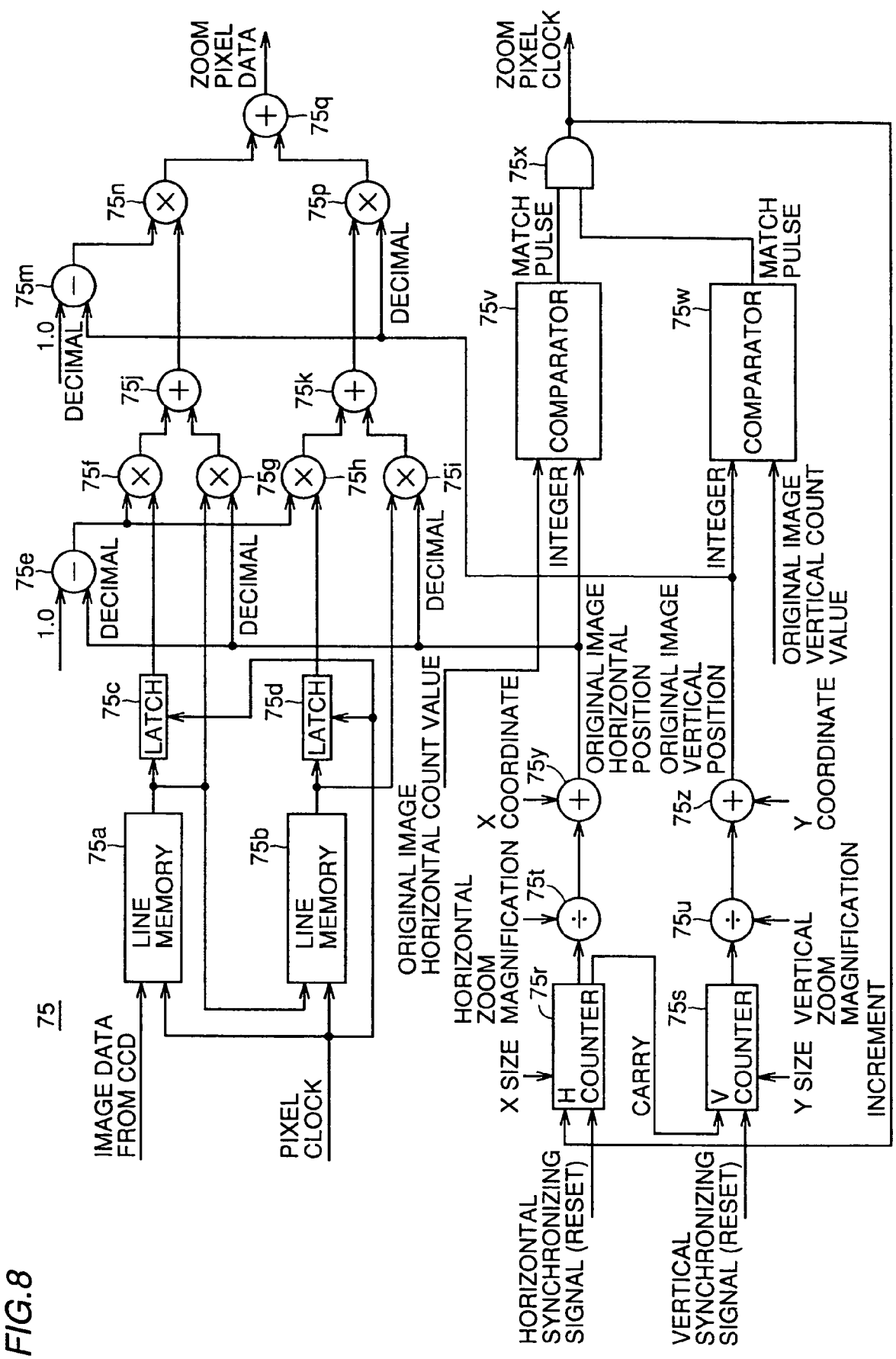
FIG. 8 is a block diagram showing a configuration of a zoom circuit shown in FIG. 7.

Zoom circuit 75 is configured as shown in FIG. 8. Image data output from signal processing circuit 74 is written to a line memory 75a in response to a pixel clock and thereafter read, delayed by one line by the same pixel clock. The read image data is again written to another line memory 75b and read delayed by one line. Therefore, from line memories 75a and 75b, image data of continuos two lines are output simultaneously. The image data output from line memory 75a is directly input to a multiplier 75g and in addition, input to a multiplier 75f delayed by one pixel by latch circuit 75c. Image data output from line memory 75b is directly input to multiplier 22i and input to multiplier 75h delayed by one pixel by latch circuit 75d.

To multipliers 75g and 75i, a decimal of the numerical value data output from an adder 75y is input, and to multipliers 75f and 75h, a complement obtained by subtracting the decimal from "1.0" by a subtracter 75e is input. Therefore, the image data applied to multipliers 75g and 75i are weighted by the decimal while the image data applied to multipliers 75f and 75h are weighted by the complement. Outputs of multipliers 75f and 75g are added by an adder 75j, while outputs of multipliers 75h and 75i are added by an adder 75k. By such multiplexing and adding operations, the image data are subjected to horizontal zooming.

The added data output from adders 75j and 75k are input to multipliers 75n and 75p. A decimal of the numerical value data output from adder 75z is input to a multiplier 75p, and a complement obtained by subtracting the decimal from "1.0" by a subtracter 75m is input to a multiplier 75n. Thus the added data output from adder 75j is multiplied by the complement, while the added data output from adder 75k is multiplied by the decimal. Thereafter, the outputs from multipliers 75n and 75p are added by an adder 75q, whereby image data subjected to zooming both in the horizontal and vertical directions are obtained.

The numerical value data output from adders 75y and 75z are calculated in the following manner. CPU 83 inputs X size data and Y size data included in the frame data to an H counter 75r and a V counter 75s, respectively. Thus the X size is the maximum count value of H counter 75r, and Y size is the maximum count number of V counter 75s. H counter 75r is incremented by the output of an AND circuit 75x, outputs a carry signal at the maximum count value, and is reset by a horizontal synchronizing signal and a vertical synchronizing signal. V counter 75s is incremented by the carry signal output from H counter 75r and reset by the vertical synchronizing signal. An output from AND circuit 75x is a clock which rises at the timing of each pixel constituting the zoom image, that is, a zoom pixel clock. Based on the zoom pixel clock, the horizontal pixel number and the vertical pixel number of the zoom image are counted by the H and V counters 75r and 75s.

A divider 75t divides the count value of H counter 75r by a horizontal zoom magnification output from CPU 83, and a divider 75u divides the count value of V counter 75s by the vertical zoom magnification output from CPU 83. The result of division by divider 75t is added to X coordinate data included in the frame data by adder 75y, whereas the result of division by divider 75u is added to Y coordinate data included in the frame data by adder 75j. The results of adders 75y and 75z represent which horizontal position and which vertical position of the original image the zoom pixel output from adder 75q at present correspond to. The horizontal position data and vertical position data of the original image are output from adders 75y and 75z, the decimal of the horizontal position data is input to subtracter 75e, multipliers 75g and 75i and the decimal of the vertical position data is input to subtracter 75m and multiplier 75p.

Integers of the horizontal and vertical position data output from adders 75y and 75z are input to comparators 75v and 75w. A horizontal count value which represents the count of horizontal pixel number of the original image is input to comparator 75v, and a vertical count value representing the count of vertical pixel number of the original image is input to comparator 75w. Comparators 75v and 75w output a match pulse when input to numerical values match each other. AND circuit 75x provides logical product of match pulses output from comparators 75b and 75w and outputs a logical product signal (AND signal) as a zoom pixel clock. The zoom pixel clock is input to memory control circuit 78, and memory control circuit 78 writes only the pixel data output from adder 75q simultaneously with zoom pixel clock to DRAM 81. Thus image data of a desired zoom magnification is obtained in the DRAM 81. Here, the original image refers to an image of the object entering the CCD imager 72, and the original image data is obtained from signal processing circuit 74.

Figure 9:
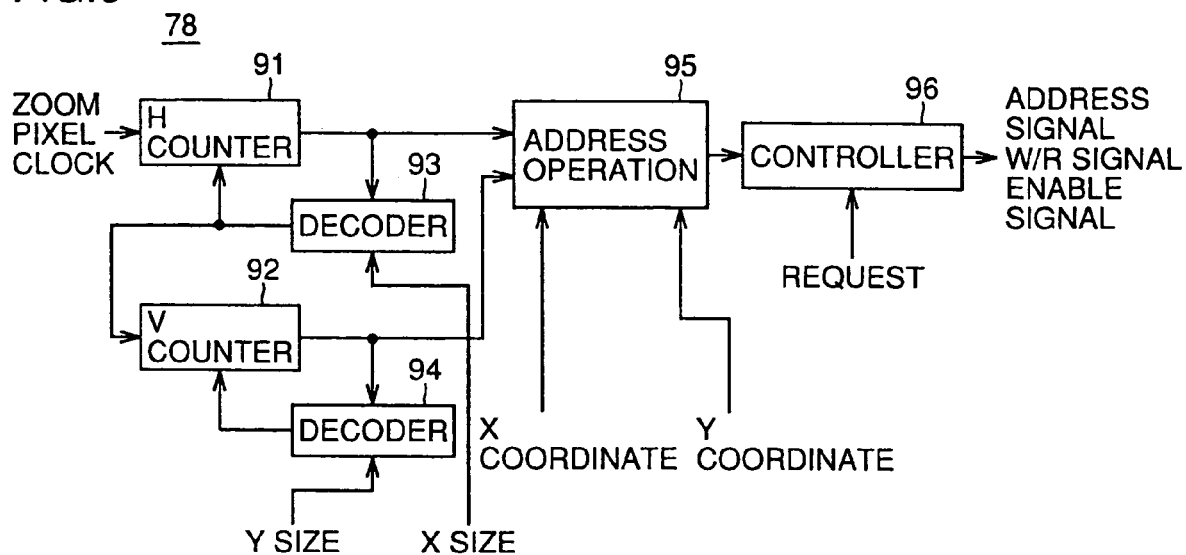
FIG. 9 is a block diagram showing a configuration of a memory control circuit shown in FIG. 7.
Figure 10:
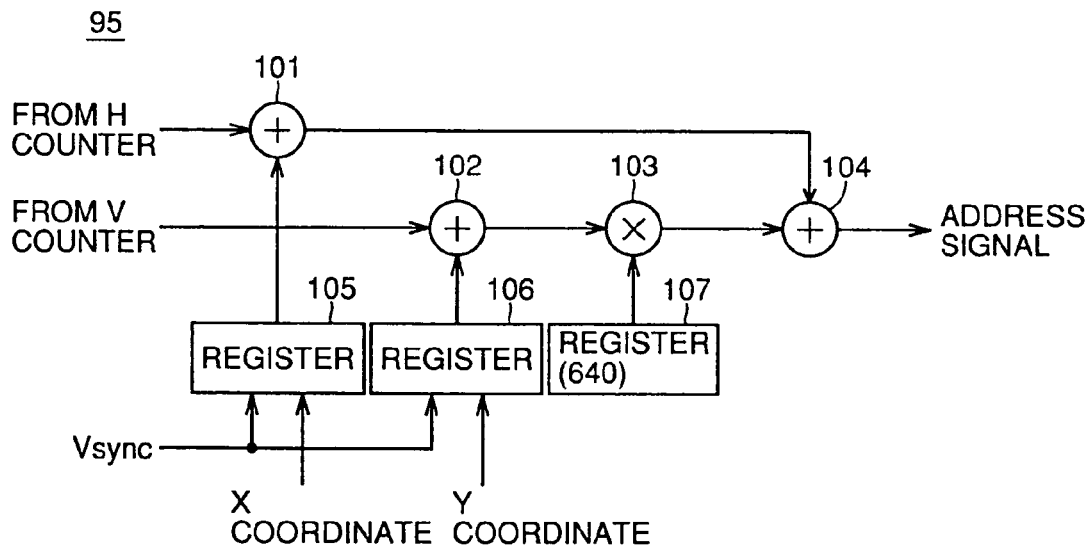
FIG. 10 is a block diagram showing a configuration of an address calculating section shown in FIG. 9.

Memory control circuit 78 is configured as shown in FIG. 9. X size data and Y size data included in the frame data are loaded to decoders 93 and 94, respectively, and X coordinate data and Y coordinate data are loaded to an address operating circuit 95. Address operating circuit 95 is configured as shown in FIG. 10, and X coordinate data and Y coordinate data are loaded to registers 105 and 106, more specifically. In the normal camera mode, decoders 93 and 94 hold numerical value data of "640" and "480", and registers 105 and 106 both hold numerical value data of "0". The numerical value data held in registers 105 and 106 are updated at the input timing of vertical synchronizing pulse $V_{sync}$.

An H counter 91 is incremented by the zoom pixel clock input from zoom circuit 75, and count value of H counter 91 (horizontal count value) is input to address operating circuit 95 and decoder 93. Decoder 93 compares the input horizontal count value with "640", and when these match each other, outputs a match pulse. H counter 91 is reset by the match pulse, and V counter 92 is incremented by the match pulse. The counter value of V counter 92 (vertical count value) is applied to address operating circuit 95 and decoder 94, and decoder 94 resets V counter 92 when the vertical count value matches "480". In this manner, H counter 91 is reset when pixels corresponding to the X size of the frame is counted, and V counter 92 is reset when lines corresponding to the Y size of the frame is counted.

Referring to FIG. 10, the horizontal and vertical count values are applied to adders 101 and 102 provided in address operating circuit 95. Adder 101 adds the horizontal count value to the X coordinate data held in register 105, while adder 102 adds the vertical count value to Y coordinate data held in register 106. The result of addition of adder 102 is thereafter applied to a multiplier 103 and multiplier 103 multiplies the input result of addition by the numerical value data "640" held in register 107. Adder 104 adds the result of addition by adder 101 to the result of multiplication by multiplier 103. More specifically, address operating circuit 95 generates an address signal by an operation represented by the following equation (1).

Address=(Horizontal Count Value+Upper Left X Coordinate)+(Vertical Count Value+Left Y Coordinate)×640  (1)

Controller 96 receives the address signal from address operating circuit 95 and a write/read request from CPU 83 or compression/decompression circuit 77, and outputs an address signal, W/R signal and an enable signal to DRAM 81. More specifically, controller 96 outputs the address signal from address operating circuit 95 as it is, and sets the enable signal to the high level at the same time. When a write request is applied, the controller sets the W/R signal to the high level, and when a read request is applied, sets the W/R signal to the low level. By such address signal, W/R signal and enable signal, an access to the desired address of video memory area 81a is performed. Memory control circuit 78 operates in the above described manner based on the frame data from CPU 83, and forms a desired frame on video memory area 81a, and therefore, on monitor 80.

Figure 11:
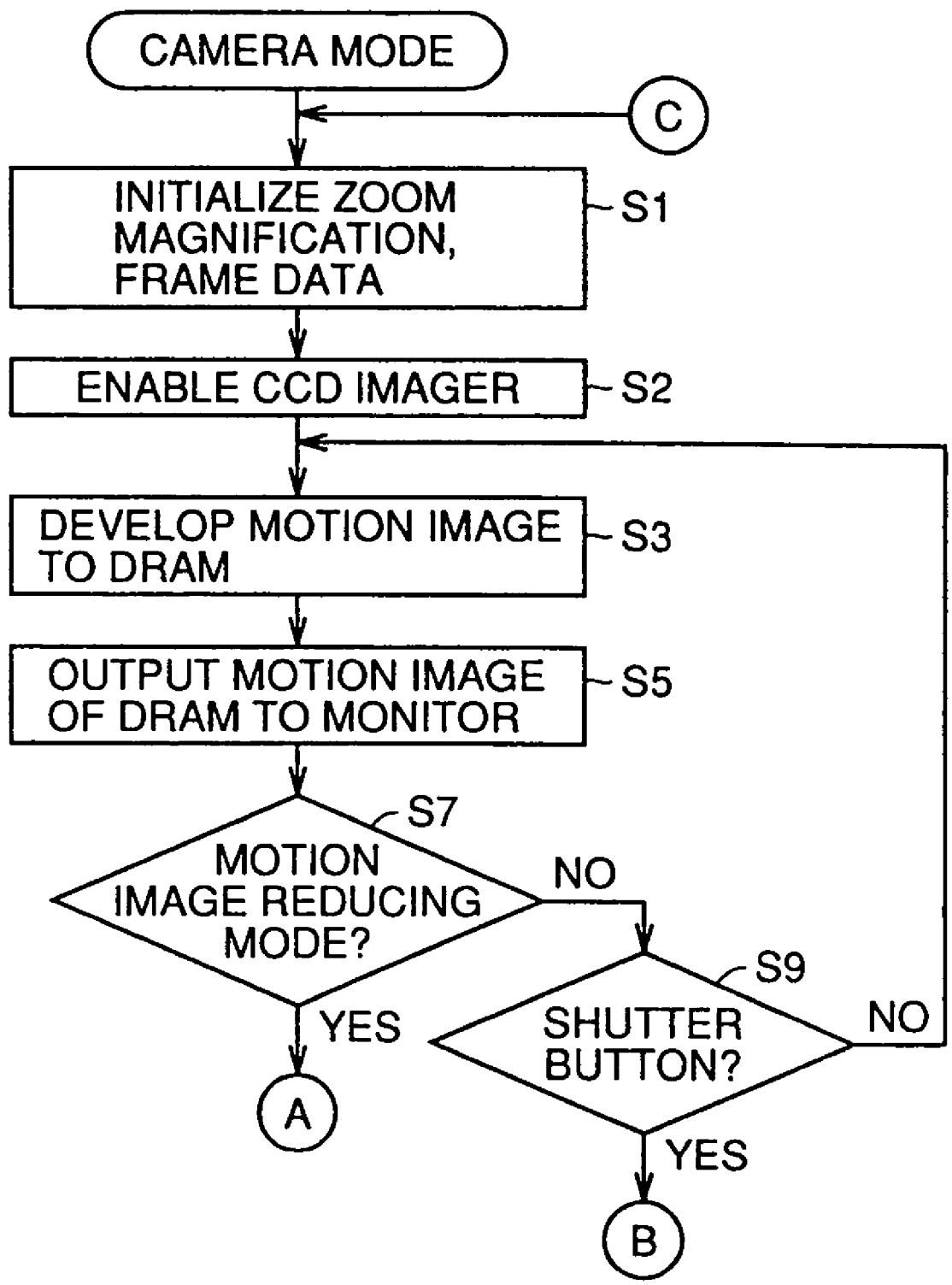
FIG. 11 is a flow chart representing part of an operation in a camera mode.
Figure 12:
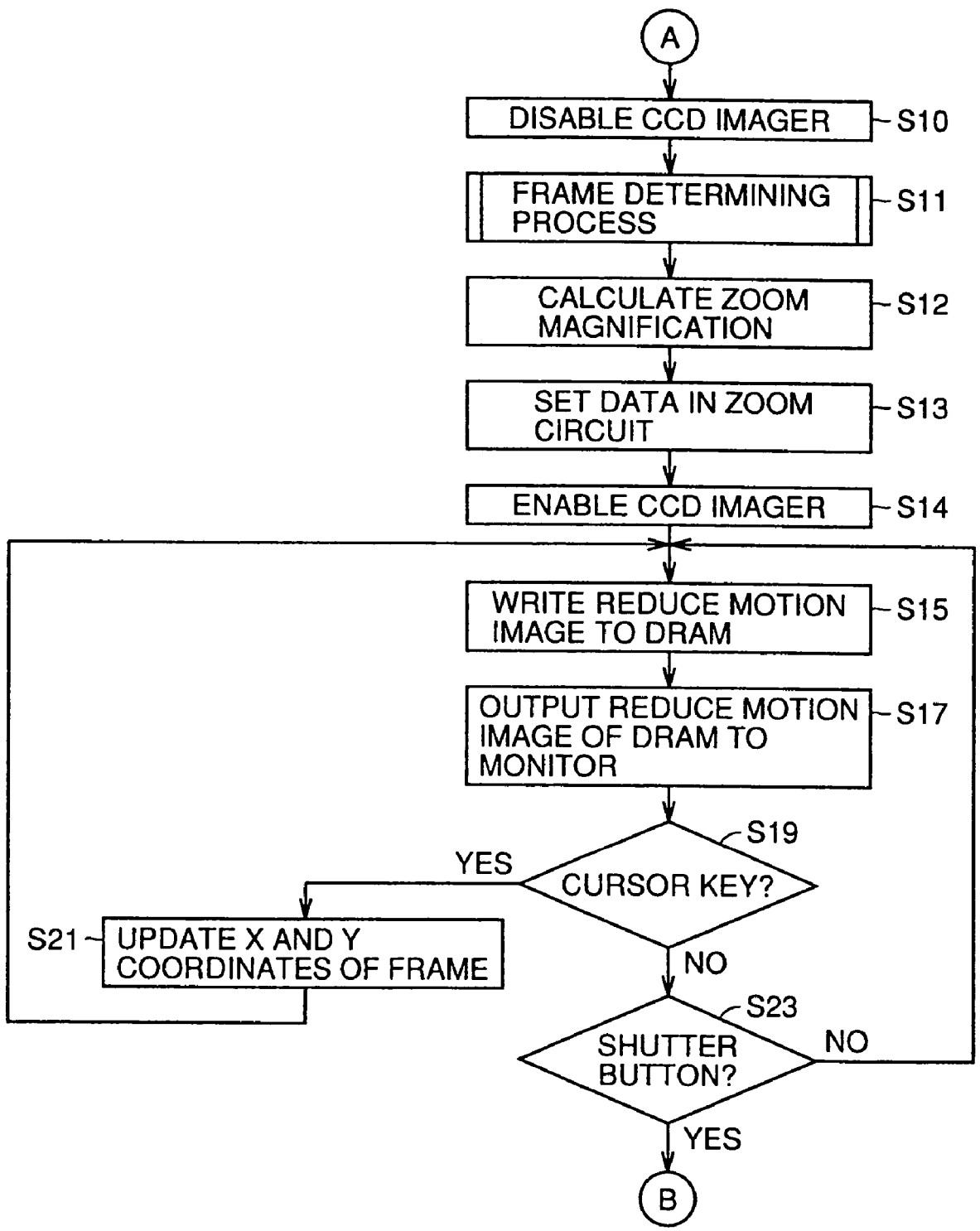
FIG. 12 is a flow chart showing another part of the operation in the camera mode.
Figure 13:
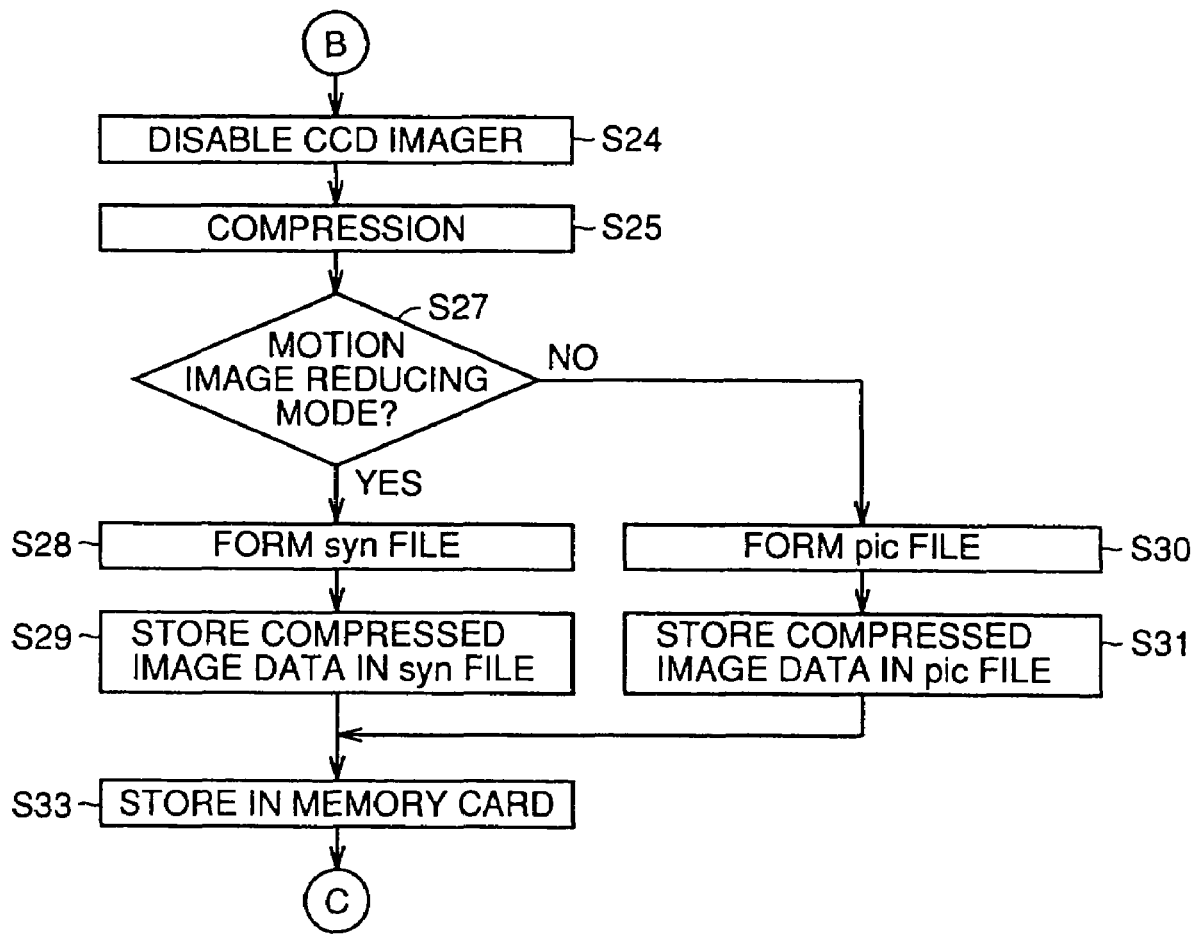
FIG. 13 is a flow chart showing a still further part of the operation in the camera mode.
Figure 14:
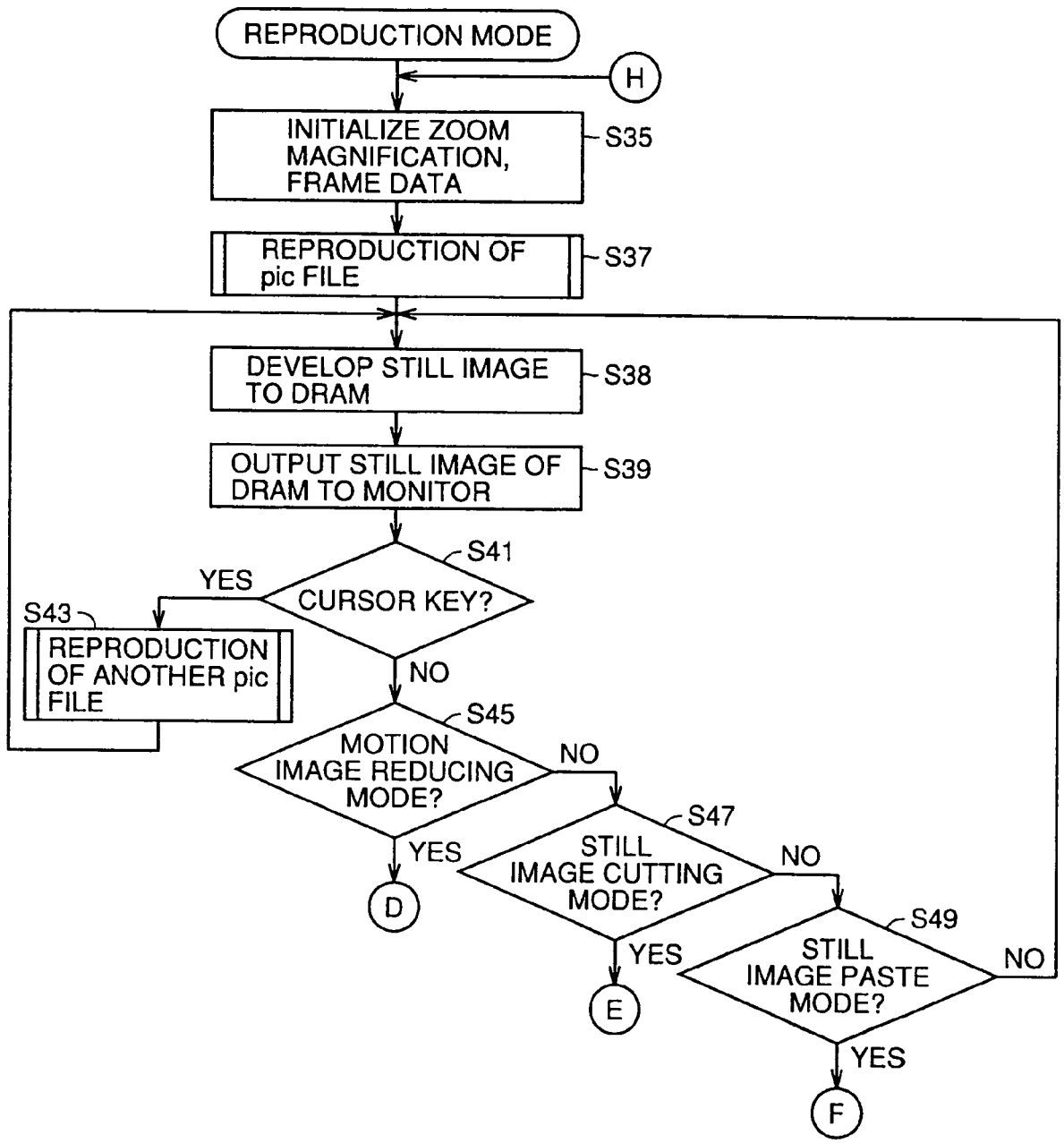
FIG. 14 is a flow chart showing a part of an operation in a reproduction mode.
Figure 15:
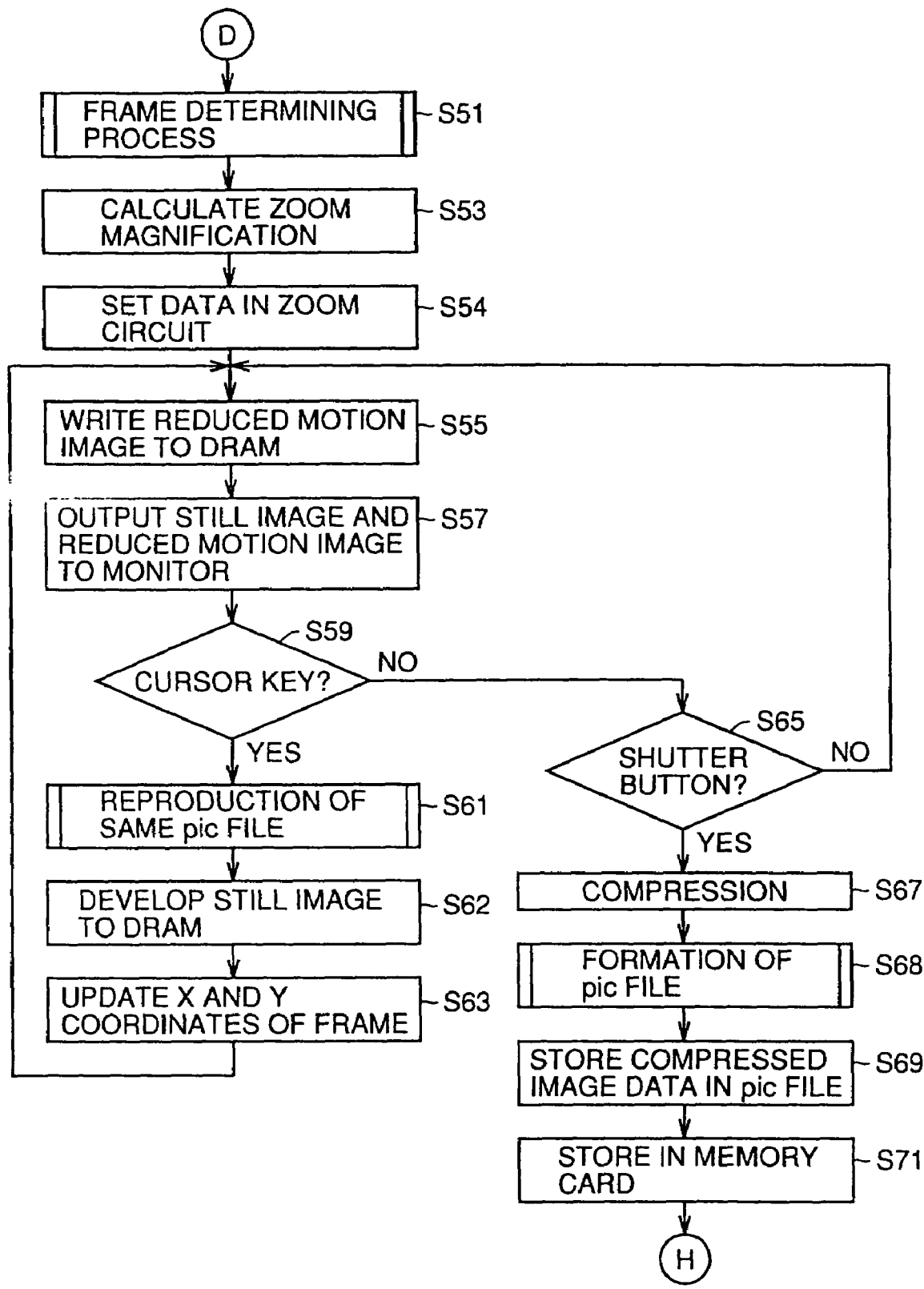
FIG. 15 is a flow chart showing another part of the operation in the reproduction mode.

CPU 83 performs the processing represented by the flow chart of FIGS. 11 to 13 when the mode setting switch 87 is set to the side of the camera, and performs the process represented by the flow chart of FIGS. 14 to 18 when the mode setting switch 87 is set to the reproducing side. Further, CPU 83 processes the subroutine represented by FIG. 19, as needed.

When the camera mode is set, CPU 83 initializes horizontal zoom magnification, vertical zoom magnification and frame data in step S1 of FIG. 11. At this time, zoom magnification is set to 1 both in the vertical and horizontal directions. As to the frame size, X and Y sizes are set to "640" and "480", and X and Y coordinates are both set to "0". Therefore, from zoom circuit 75, the picked up image data is output with the zoom magnification of 1, and an instruction is given to memory control circuit 78 so that a motion picture frame corresponding to the monitor frame is formed. CPU 83 instructs timing generator 84 to read charges in step S2, that is, enables CCD imager 72 in step S2, and thereafter, in step S3, outputs a write request to memory control circuit 78 so that image data of one frame are written from zoom circuit 75 to video memory area 81a. As a result, a motion image frame corresponding to the monitor frame is formed on video memory area 81a, and image data are written to the motion image frame.

In step S5, CPU 83 applies a read request to memory control circuit 78 and reads all image data from video memory area 81a. Consequently, a real time object image is displayed fully on the monitor frame. More specifically, a motion image frame of the same size as the monitor frame is formed on monitor 80, and the picked up motion image is displayed on the motion image frame. Thereafter, in steps S7 and S9, CPU 83 determines whether a motion image reducing mode is set or not and whether shutter button 89 is pressed or not. If the answer in each step is "NO", the flow returns to step S3. Therefore, unless the operator performs any key operation, the processes of steps S3 and S5 are repeated, and a motion image is continuously displayed on monitor 80.

When the operator operates shutter button 89 with the motion image being output from monitor 80, CPU 83 determines that the answer of step S9 is "YES", and in step S24 of FIG. 13, CPU 83 instructs timing generator 84 to stop reading of charges. Thus CCD imager 72 is disabled, and image data at the time point when shutter button 89 is pressed is maintained in video memory area 81a. Thereafter, CPU 38 reads the image data from video memory area 81a in step S25, applies the data to compression/decompression circuit 77 and performs JPEG compression. In step S25, in addition to reading of image data, a compression instruction is applied to compression/decompression circuit 77, whereby the image data is compressed.

In step S27, whether the present operation mode is the motion image reducing mode or not is determined. If it is "NO", then in steps S30 and S31, an instruction to form a pic file and an instruction to store the compressed image data to the pic file are applied to compression/decompression circuit 77, respectively. In step S31, writing of the size data of the motion image frame to the pic file is also instructed. Therefore, the image data picked up in the normal camera mode are stored in the image file "pic000P.jpg" having an identifier "pic" added thereto (where P is an integer), and the size data of the motion image frame is written to the header portion of the image file. CPU 83 records such a pic file in memory card 82 in step S33, and the flow returns to step S1. In step S33, memory card 82 is instructed to write the image file.

When the operator sets the motion image reducing mode by the operation of a menu, CPU 83 determines it is "YES" in step S7, disables CCD imager 72 in step S10 of FIG. 12, and performs frame determining process in step S11.

Figure 19:
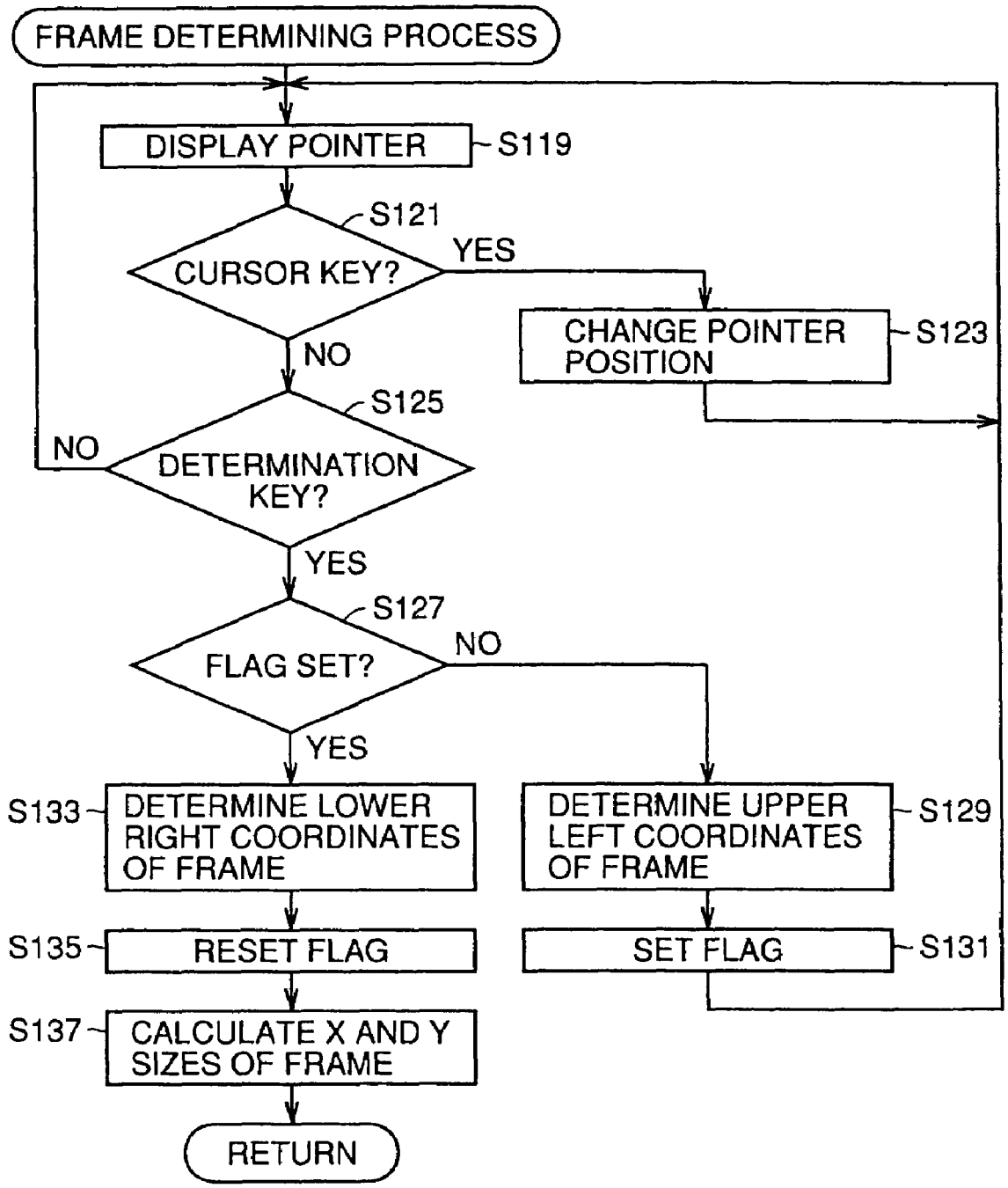
FIG. 19 is a flow chart showing a part of an operation in a motion image reducing mode.

More specifically, referring to FIG. 19, in step S119, pointer data is read from character area 81b of DRAM 81, and the pointer is displayed on monitor 80. Thereafter, in steps S121 and S125, operations of cursor keys 86a to 86d and determination key 88 are monitored, respectively. When any of cursor keys 86a to 86d is operated, CPU 83 determines that it is "YES" in step S121, changes the position of display of the pointer in accordance with the key operation in step S123, and the flow returns to step S119. When determination key 88 is operated, whether flag 83a is set or not is determined in step S127. If flag 83a is not set, CPU 83 determines the present pointer position as an upper left coordinates of the motion image frame in step S129, sets flag 83a in step S131, and the flow returns to step S119.

When it is determined in step S127 that flag 83a is set, CPU 83 determines the present pointer position as the lower right coordinates of the motion image frame in step S133. In step S135, flag 83a is reset, and in step S137, the X and Y sizes of the motion image frame are calculated in accordance with the following equation (2). More specifically, by subtracting the upper left X coordinate from the lower right X coordinate of the motion image frame, the X size is calculated, and by subtracting the upper left Y coordinate from the lower right Y coordinate of the motion image frame, the Y size is calculated.

X size=lower right X coordinate—upper left X coordinate

Y size=lower right Y coordinate—upper left Y coordinate

Upper left X coordinate: X coordinate at an upper left vertex of rectangular frame Upper left Y coordinate: Y coordinate at the upper left vertex of rectangular frame Lower right X coordinate: X coordinate at a lower right vertex of rectangular frame Lower right Y coordinate: Y coordinate at the lower right vertex of the rectangular frame (2)

Returning to FIG. 12, in step S12, zoom magnification of the motion image is calculated in accordance with the following equation (3). The calculated zoom magnification is set in the zoom circuit 75. More specifically, the Z size of the calculated motion image frame is divided by the X size of the monitor frame to calculate the horizontal zoom magnification, and the Y size of the calculated motion image frame is divided by the Y size of the monitor frame to calculate the vertical zoom magnification.

Horizontal zoom magnification=X size of the motion image frame/X size of the monitor frame Vertical zoom magnification=Y size of the motion image frame/Y size of the monitor frame (3)

Thereafter, in step S13, the size data and the upper left coordinate data of the frame obtained in step S11 and the zoom magnification calculated in step S12 are set in zoom circuit 75. In this manner, the data of reduced image which has been reduced in size to be within the motion image frame are generated.

Thereafter, in step S14, CPU 83 instructs timing generator 84 to read charges, and enables CCD imager 72. In step S15, CPU 83 applies a write request to memory control circuit 78, and data of X and Y sizes and upper left X and Y coordinates calculated in step S11, that is, frame data of the motion image frame are applied to memory control circuit 78. Accordingly, a desired motion image frame is formed in video memory area 81a, and the reduced image data output from zoom circuit 75 is written to the motion image frame. In step S17, CPU 83 applies a read request and the initial frame data to memory control circuit 78, and all image data stored in video memory area 81a are read. Accordingly, the reduced motion image and gray image are displayed on monitor 80. More specifically, the reduced motion image is displayed on the motion image frame formed on monitor 80, and on the portion other than the motion image frame of the monitor frame, gray image is displayed. When the motion is image frame formed by the operator has an aspect ratio different from that of the monitor frame, the reduced motion image displayed is distorted in the horizontal or vertical direction.

CPU 83 monitors operations of cursor keys 86a to 86d and shutter button 89 in steps S19 and S23, and when none of these is operated, repeats the processes of steps S15 and S17. Thus the reduced motion image is displayed in the motion image frame. When any of cursor keys 86a to 86d is operated, the image data in video memory area 81a is cleared in step S21, the X and Y coordinates data contained in the frame data, that is, the upper left coordinate data of the motion image frame are updated, and thereafter the flow returns to step S15. In this manner, the write position of reduced image data is changed, and as a result, the motion image frame displayed on monitor 80 moves.

When shutter button 89 is operated, CPU 83 disables CCD imager 72 in step S24, and performs JPEG compression on the reduced image data at the time when the shutter button 89 is pressed, in step S25. At this time, CPU 83 applies a read request and the frame data of the motion image frame to memory control circuit 78, and instructs compression/decompression circuit 77 to perform JPEG compression. Therefore, only the image data within the motion image frame are compressed. In step S27, whether the present operation mode is the motion image reducing mode or not is determined and if it is "YES", then instruction to form an image file "syn000S.jpg" (where S is an integer) with an identifier "syn" is applied to compression/decompression circuit 77 in step S28, and an instruction to store the compressed image data to syn file and to write the size data of the motion image frame to the syn file is applied to compression/decompression circuit 77 in step S29. Accordingly, the image data of a frame smaller than the monitor frame is stored in the syn file, and size data of the motion image frame is written to the header portion of the syn file. CPU 83 stores the syn file storing the image data in this manner in memory card 82 in step S33, and the flow returns to step S1.

Figure 20A:
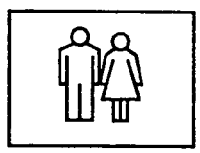
FIGS. 20A to 20F are illustrations representing an exemplary operation in the motion image reducing mode.
Figure 20B:
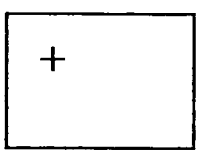
Figure 20C:
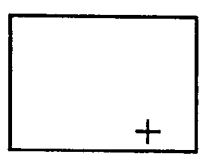
Figure 20D:
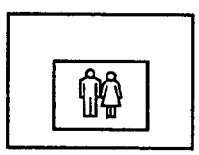
Figure 20E:
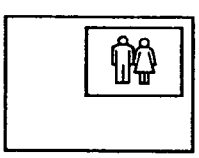
Figure 20F:
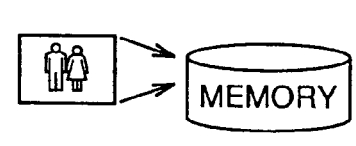

When the camera mode is set, a motion image of the object is displayed on monitor 80 as shown in FIG. 20A, for example. When the operator sets the motion image reducing mode here, display of the object disappears as shown in FIG. 20B, and, instead, a cross shaped pointer is displayed on monitor 80. The pointer moves on the screen in accordance with the operation of cursor keys 86a to 86d. When the operator operates the determination key 88 at the pointer position shown in FIG. 20B, the pointer position serves as the upper left coordinates of the motion image frame. After the upper left coordinates are determined, display of the pointer continuous, and the pointer moves on the screen in accordance with the operation of cursor keys 86a to 86d. When the operator moves the pointer to a position represented in FIG. 20C and presses determination key 88, the pointer position will be the lower right coordinates of the motion image frame. In this manner, the position and the size of the motion image frame are determined. Then, the motion image frame is formed on monitor 80, and the motion image of the object is reduced and displayed on the motion image frame. The display position of the reduced motion image moves by operating cursor keys 86a to 86d after the reduced motion image is displayed, as shown in FIG. 20E. When the operator presses shutter button 89 while the reduced motion image is being displayed on monitor 80, only the image in the motion image frame is recorded on memory card 82 as shown in FIG. 20F.

When the operator sets the mode setting switch 87 to the reproducing side, CPU 83 performs the processing represented by the flow chart of FIGS. 14 to 18. First, in step S35, zoom magnification and the frame data are initialized, and in step S37, the pic file is reproduced from memory card 82. In step S37, a read instruction is applied to memory card 82 so that the latest pic file is read, and the compressed image data stored in the pic file are decompressed by compression/decompression circuit 77. When decompression is completed, a write request of decompressed image data is input from compression/decompression circuit 77 to memory control circuit 78. CPU 83 inputs initial frame data to memory control circuit 78 at the same timing as the write request in step S38, so that the decompressed image data is written to video memory area 81a. In this manner, a still image frame corresponding to the monitor frame is formed in video memory area 81a, and the decompressed image data, that is, the reproduced still image data are written to the still image frame.

Thereafter, CPU 83 applies the initial frame data and the read request to memory control circuit 78 in step S39, and reads the reproduced image data from video memory area 81a. Accordingly, the reproduced image is displayed on monitor 80. Thereafter, CPU 83 monitors operation of cursor key 86c or 86d, and monitors whether the motion image reducing mode, a still image cutting mode and a still image paste mode is set or not in steps S45, S47 and S49, respectively. When there is no key operation and no mode setting, CPU 83 repeats the operation of step S39, and accordingly, the same still image is continuously displayed on monitor 80.

When cursor key 86c or 86d is operated, CPU 83 reproduces another pic file from memory card 82 in step S43, and thereafter returns to step S39. In this case also, CPU 83 applies a read instruction to memory card 82 to read a desired pic file, and the compressed image stored in the pic file is decompressed by compression/decompression circuit 77. The decompressed image data are overwritten on video memory area 81a in step S38. Thus the reproduced image to be displayed on monitor 80 is updated. When the motion image reducing mode is selected, the flow proceeds to step S51, when the still image cutting mode is selected, the flow proceeds to step S73, and when the still image paste mode is selected, the flow proceeds to step S88.

When the motion image reducing mode is set, CPU 83 performs the process of determining the motion image frame in accordance with the subroutine shown in FIG. 19 in step S51, and calculates the zoom magnification in accordance with the above equation (3) in step S53. In step S54, the upper left coordinates data, the size data and the zoom magnification are set in zoom circuit 75. Accordingly, a reduced image data corresponding to the size of the motion image frame are output from zoom circuit 75. CPU 83 further sets the frame data of the motion image frame determined in step 51 and the write request to memory control circuit 78 in step S55, and the reduced image data are written to the motion image frame formed on video memory area 81a. Accordingly, on the reproduced image data which has been already written to the video memory area 81a, the reduced image data are synthesized. Thereafter, CPU 83 applies the read request and the initial frame data to memory control circuit 78 in step S57, reads all the image data stored in DRAM 81 and outputs the data through monitor 80. When operator operates none of cursor keys 86a to 86d and shutter button 89, CPU 83 repeats the processes of steps S55 and S57. Consequently, a motion image is displayed on the motion image frame formed on monitor 80, and on a portion of the monitor frame other than the motion image frame, a still image is displayed.

When the operator operates any of cursor keys 86a to 86d, CPU 83 determines that it is "YES" in step S59. In step S61, the same pic file as the last time is reproduced from memory card 82, the initial frame data is input to memory control circuit 78 in step S62 and the reproduced image data are written to video memory area 81a. In step S63, the upper left X and Y coordinates of the motion image frame are updated, and the flow returns to step S55. In step S55, the reduced image data are written to the motion image frame of which position has been moved, and in step S57, all the image data in video memory area 81a are read. In this manner, as reproduction of the pic file is repeated every time the cursor keys 86a to 86d is operated, the still image is not missed after the motion image frame is moved.

When the operator operates shutter button 89, CPU 83 determines that it is "YES" in step S65, and performs JPEG compression on all the image data stored in video memory area 81a in step S67. At this time, CPU 83 applies the read request and the initial frame data to memory control circuit 78, and applies the compression instruction to compression/decompression circuit 77. Consequently, compressed image data are generated. Thereafter, in step S68, instruction to form a pic file is applied, and in step S6, instruction to store the compressed image data to the pic file and writing of the frame data of the monitor frame are applied. Thereafter, in step S71, the pic file in which the compressed image data are stored is stored in memory card 82, and the flow returns to step S35.

Figure 21F:
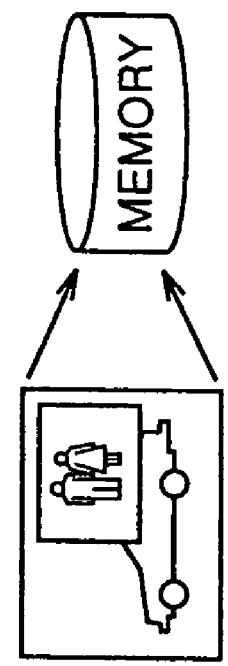
FIGS. 21A to 21F are illustrations representing another exemplary operation in the motion image reducing mode.
Figure 21E:
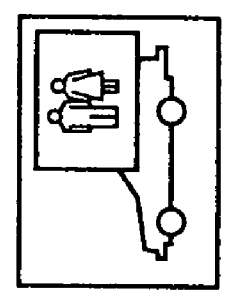
Figure 21D:
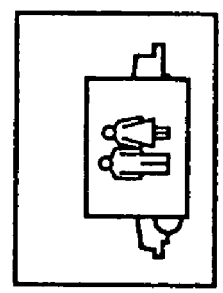
Figure 21C:
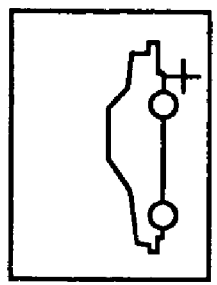
Figure 21B:
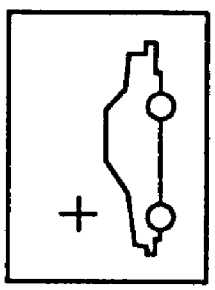
Figure 21A:
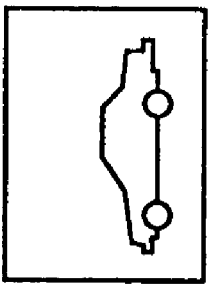

When the motion image reducing mode is set with the reproduced image being displayed on monitor 80 as shown in FIG. 21A, a pointer is displayed on monitor 80 as shown in FIG. 21B. The pointer also moves in accordance with the operation of cursor keys 86a to 86d, and in accordance with the operation of determination key 70, the upper left and lower right coordinates of the motion image frame are determined. When the determination key is operated at the positions shown in FIGS. 21B and 21C, the motion image frame is formed as shown in FIG. 21D, within which the reduced motion image of the object is displayed. The formed motion image frame moves on the screen in accordance with the operation of cursor keys 86a to 86d. As the still image is reproduced repeatedly in accordance with the operation of cursor keys 86a to 86d, the still image which has been covered by the motion image frame before movement is not missed even when the motion image frame is moved. When the shutter button 89 is pressed after the motion image frame is moved to the position represented by FIG. 21E, all the images displayed are stored in the memory card 82 as shown in FIG. 21F.

Figure 16:
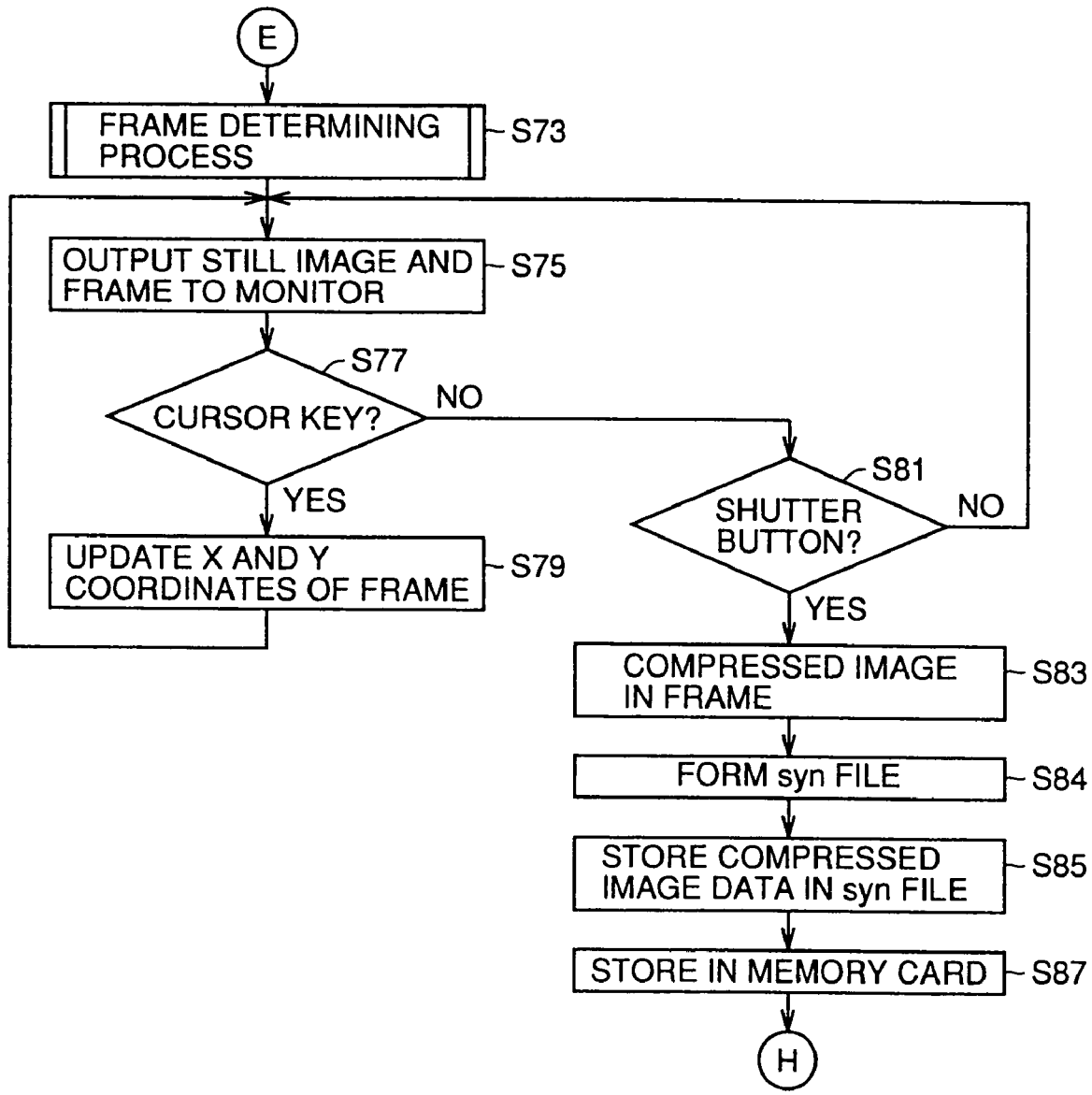
FIG. 16 is a flow chart showing a further part of the operation in the reproduction mode.

Returning to FIG. 14, when it is determined in step S47 that the still image cutting mode is set, CPU 83 processes the subroutine shown in FIG. 19 in step S73 of FIG. 16, and determines the still image frame. In step S75, still image data are read from video memory area 81a, and character data of the still image frame are read from character area 81b and output to monitor 80. Accordingly, a still image frame is synthesized and displayed on the still image. When the operator operates cursor keys 86a to 86d, CPU 83 determines that it is "YES" in step S77, and updates the upper left coordinate data of the still image frame in step S79. More specifically, the X and Y coordinates of the frame data to be applied to memory control circuit 78 are updated. Thereafter, the flow returns to step S75. Accordingly, the still image frame moves on monitor 80. When the operator operates shutter button 89, CPU 83 applies the image data in the still image frame to compression/decompression circuit 77 in step S83 and performs JPEG compression thereon. Thereafter, a syn file is formed in step S84, and the compressed image data are stored in the syn file in step S85. In step S87, the sun file storing the compressed image data is stored in memory card 82, and the flow returns to step S35.

Figure 22A:
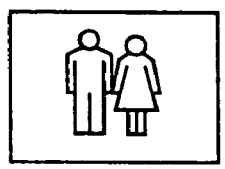
FIGS. 22A to 22E are illustrations representing an exemplary operation of a still image cutting mode.
Figure 22A:
Figure 22B:
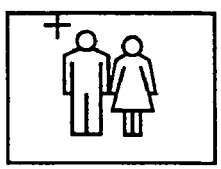
Figure 22B:
Figure 22C:
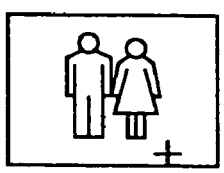
Figure 22C:
Figure 22D:
Figure 22D:
Figure 22E:
Figure 22E:

When the still image cutting mode is set with the still image reproduced from memory card 82 being displayed as shown in FIG. 22A, a pointer is displayed as shown in FIG. 22B. When the cursor keys 86a to 86d and determination key 88 are operated in the similar manner as described above, the upper left and lower right coordinates of the still image frame are determined. The still image frame is displayed on monitor 80 as shown in FIG. 22D. The still image frame moves in the monitor frame in accordance with the operation of cursor keys 86a to 86d. When shutter button 89 is pressed with the still image frame being displayed as shown in FIG. 22D, only the partial still image within the still image frame is stored in memory card 82 as shown in FIG. 22E.

Figure 17:
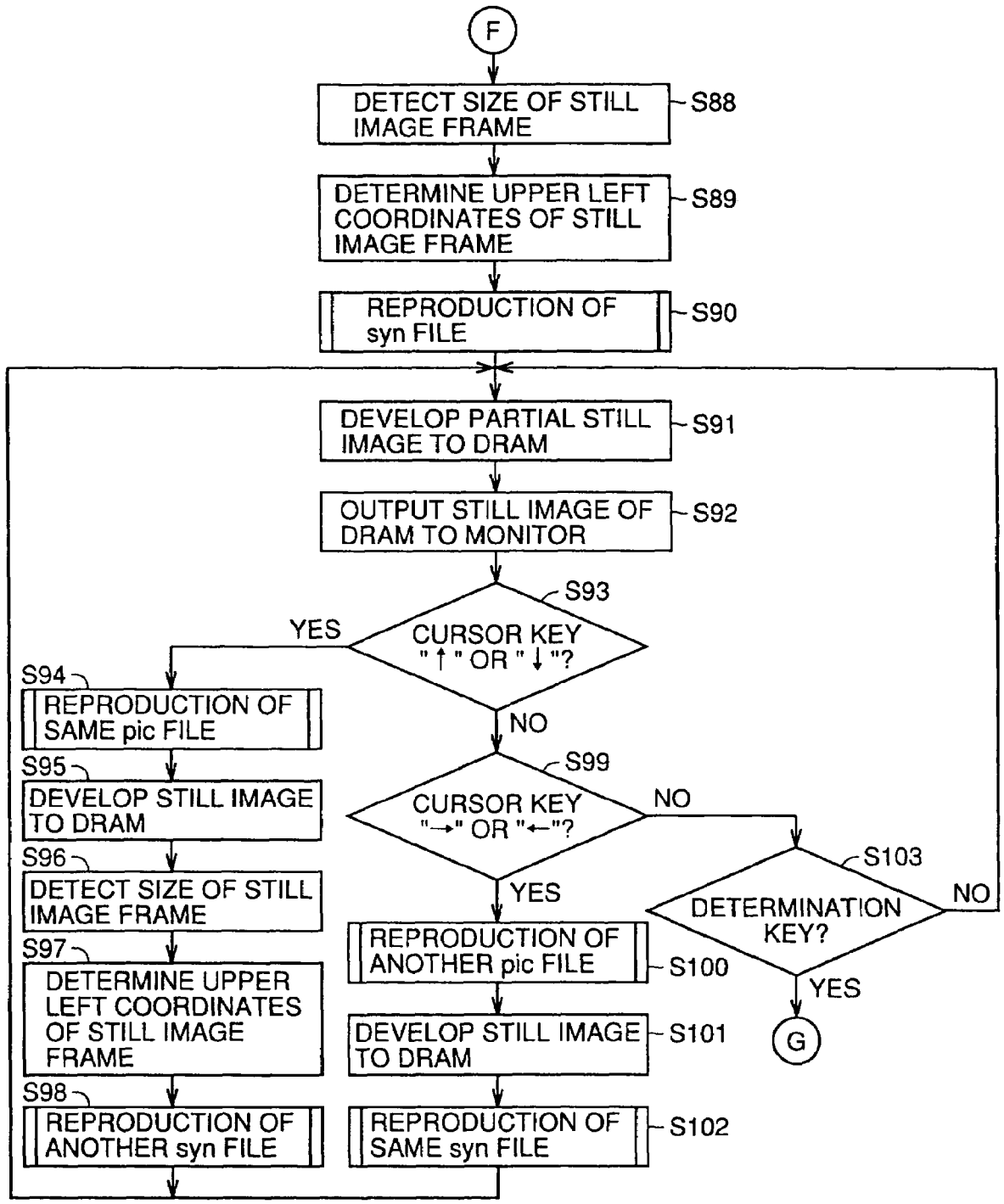
FIG. 17 is a flow chart showing a still further part of the operation in the reproduction mode.
Figure 18:
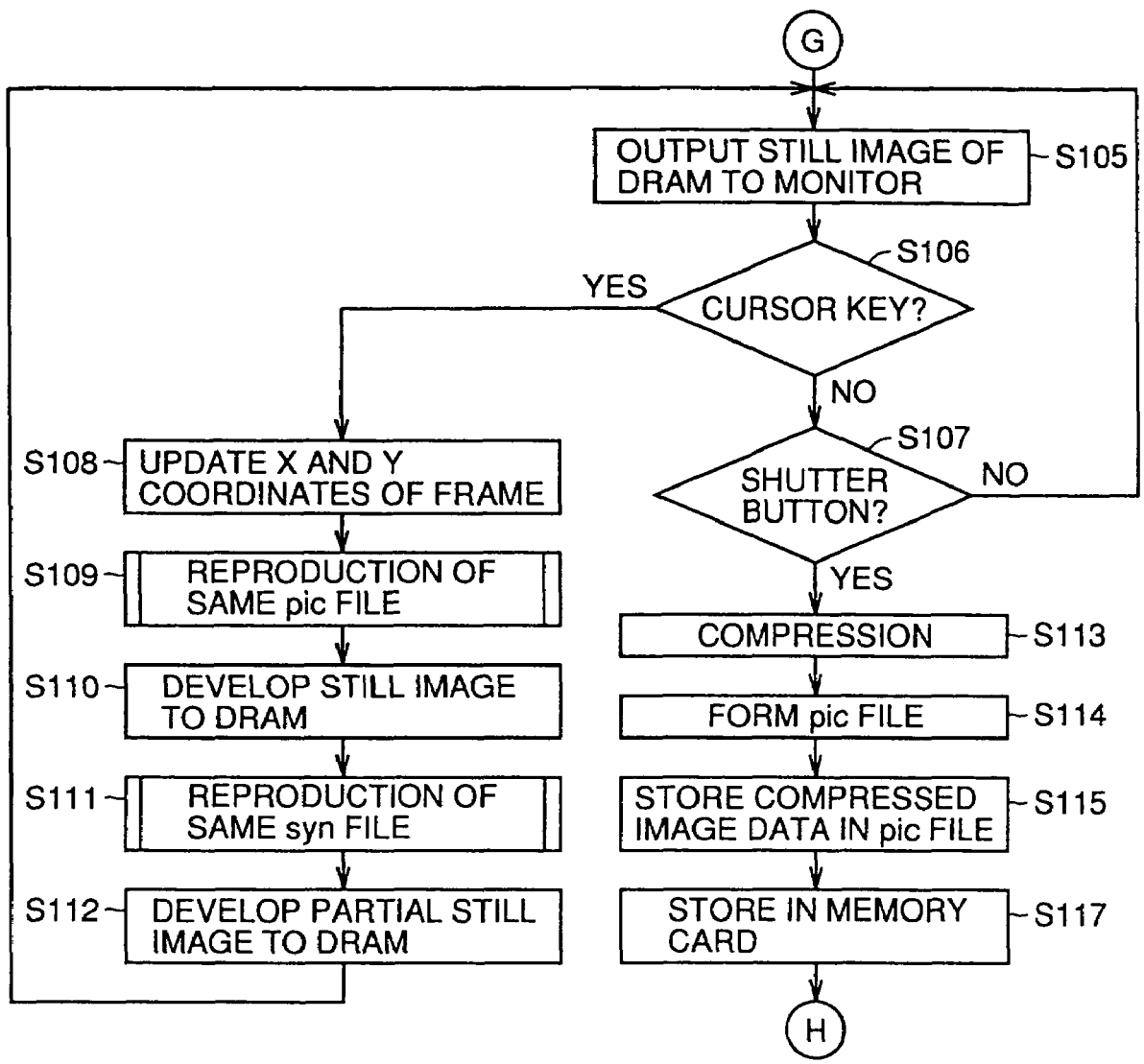
FIG. 18 is a flow chart showing a still further part of the operation in the reproduction mode.

Returning to FIG. 14, if it is determined in step S49 that the still image paste mode is selected, CPU 83 reads any of the syn files from memory card 82 in step S88 shown in FIG. 17, and detects the frame size data of the partial image data stored therein from the header of the syn file. Further, CPU 83 determines the upper left coordinate of the still image frame such that the partial still image is displayed at the center of the monitor frame, in step S89. When the frame data of the still image frame is determined in this manner, CPU 83 reproduces the same syn file in step S90. More specifically, the same syn file is read from memory card 82, and the compressed image data contained in the, read syn file are decompressed by the compression/decompression circuit 77. Thereafter, the decompressed image data are written to video memory area 81a in step S91. At the time of writing to the video memory area 81a, CPU 83 applies a write request and the frame data determined in steps S88 and S89 to memory control circuit 78. Accordingly, the still image frame is formed in video memory area 81a, and the decompressed partial still image data are written to the still image frame.

In step S91, the read request and the initial frame data are applied to memory control circuit 78, and all the image data in the video memory area 81a are output to monitor 80. Accordingly, on the still image displayed before the setting of the still image paste mode, the still image frame is formed, and the partial still image newly reproduced from memory card 82 is synthesized within the still image frame. When operator operates cursor key 86a or 86b at this time, the partial still image is switched. CPU 83 reproduces the same pic file as the last time in step S94, inputs the initial frame data to memory control circuit 78 in step S95. and writes the reproduced image data to video memory area 81a. In steps S96 and S97, processes similar to those in steps S88 and S89 are performed, and the frame data of the still image frame are updated. Thereafter, another syn file is reproduced in step S97, and the flow returns to step S91. If the partial still image to be reproduced this time is smaller than the partial still image reproduced last time, part of the still image displayed behind the partial still image will be lost. Therefore, the same pic file is reproduced first, and thereafter another syn file is reproduced.

When cursor key 86c or 86d is operated by the operator, the still image displayed behind the partial still image is updated. At this time, CPU 83 determines that it is "YES" in step S99, and another pic file in accordance with the key operation is reproduced in step S100, and the reproduced image data are written to video memory area 81a in step S101. Thereafter, the same syn file is reproduced in step S102 and the flow returns to step S91. In this manner, desired two still images can be selected.

When determination key 88 is pressed with desired two still images being displayed, CPU 83 determines that it is "YES" in step 103, and the flow proceeds to step S105. In step S105, all the image data of video memory area 81a are output to monitor 80 as in step S91. Thereafter, in step S106, whether any of cursor keys 86a to 86d is operated or not is determined and if it is "YES", the upper left coordinates of the frame data to be applied to memory control circuit 78 are updated in step S108. Thereafter, the same pic file as the last time is reproduced in step S109, and the reproduced image data are written to the video memory area 81a in accordance with the initial frame data in step S110. Thereafter, in step S111, the same syn file as the last time is reproduced in step S111, and the reproduced image data, that is, the partial still image data are written to the still image frame which has been moved, in step S112. In step S112, the updated frame data and the write request are applied to memory control circuit 78 in the similar manner as described above, and the partial still image data are written to the form still image frame. Thereafter, the flow returns to step S105. In this manner, the display position of the partial still image is changed in accordance with the key operation.

When the operator operates the shutter button 89, CPU 83 performs compression processing on all the image data stored in video memory area 81a in step S113, a pic file is formed in step S114, and the compressed image data are stored in the pic file in step S115. Thereafter, the pic file storing the compressed image data is stored in the memory card 82 in step S117, and the flow returns to step S35.

Figure 23A:
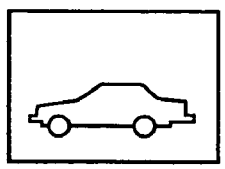
FIGS. 23A to 23D are illustrations representing an exemplary operation in a still image pasting mode.
Figure 23A:
Figure 23B:
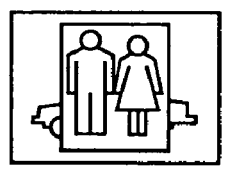
Figure 23B:
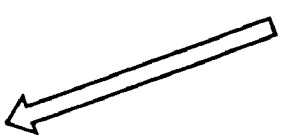
Figure 23C:
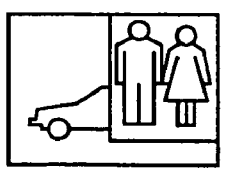
Figure 23C:
Figure 23D:
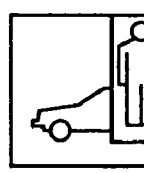
Figure 23D:
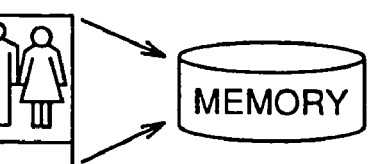

When the still image paste mode is set with the still image reproduced from the pic file being displayed on monitor 80, the partial still image reproduced from the syn file is synthesized with the still image of the pic file as shown in FIG. 23B. When cursor key 86a or 86b is operated in this state, the partial still image is switched, and when cursor key 86c or 86d is operated, the still image behind the partial still image is switched. When the any of cursor keys 86a to 86d is operated after the two images to be synthesized are determined, the partial still image is moved as shown in FIG. 23C. When shutter button 89 is pressed with the partial still image being arranged at a desired position, all the still images displayed are recorded on memory card 82, as shown in FIG. 23D.

Though the reduced motion image is displayed in the motion image frame in the present embodiment, a motion image with the magnification of one (1) may be displayed in the motion image frame. More specifically, only a part of the motion image displayed in the monitor frame in the normal camera mode may be displayed in the motion image frame. In that case, the motion image displayed changes in accordance with the position of the motion image frame.

Further, through the motion image frame and the still image frame are formed to have a rectangle shape in the present embodiment, the motion image frame and the still image frame may be circular. In that case, the size of the frame can be identified by the radius of the circle, and the position of the frame can be specified by the coordinates of the center.

Althrough the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:

a reproducing unit responsive to a reproduction instruction by an operator for reproducing a still image from a recording medium, a first forming unit responsive to said reproduction instruction for forming a still image frame equal to a rectangular monitor frame on a monitor, a still image display unit displaying said still image in said still image frame, an image pickup unit picking up an image of an object, a second forming unit responsive to a motion image frame forming instruction by said operator for forming a rectangular motion image frame smaller than said monitor frame on said monitor, a motion image display unit displaying a motion image of said object picked up by said image pickup unit in said motion image frame, and a recording unit responsive to a recording instruction by said operator for recording an image in said monitor frame on said recording medium, wherein said second forming unit includes an input unit for receiving, as inputs, arbitrary position information, arbitrary horizontal size information and arbitrary vertical size information of said motion image frame, and a motion image frame forming unit for forming said motion image frame on said monitor based on said position information, said horizontal size information, and said vertical size information, wherein said motion image display unit includes a first calculating unit for calculating a horizontal zoom magnification of said motion image based on the horizontal size of said monitor frame and the horizontal size of said motion image frame, a second calculating unit for calculating a vertical zoom magnification of said motion image based on the vertical size of said monitor frame and the vertical size of said motion image frame, a zoom processing unit for performing reduction zoom processing on said motion image based on said horizontal zoom magnification and said vertical zoom magnification, and a reduced image display unit displaying a reduced motion image reduced by said zoom processing unit in said motion image frame.

2. The digital camera according to claim 1, wherein said reduced image display unit includes a reduced motion image synthesizing unit for synthesizing said still image with said reduced motion image based on said motion image frame forming instruction.

3. The digital camera according to claim 1, wherein said recording unit includes a file generating unit for generating an image file added with a predetermined identifier, and a storing unit for storing an image in said monitor frame in said image file.

4. The digital camera according to claim 1, wherein said monitor also functions as a view finder.

5. A digital camera comprising:

a first reproducing unit responsive to a reproduction instruction by an operator for reproducing a still image signal from a recording medium, a first forming unit responsive to said reproduction instruction for forming a still image frame corresponding to a monitor frame on a memory, a first writing unit for writing said still image signal in said still image frame, a first display unit for reading out said still image signal from said memory for displaying a still image on a monitor, an image pickup unit for picking up an image of an object, a second forming unit responsive to a motion image frame forming instruction by said operator for forming a motion image frame smaller than said still image frame in said still image frame, a second writing unit for writing a motion image signal of said object picked up by said image pickup unit in said motion image frame, a second display unit reading out a synthesized image signal of said still image signal and said motion image signal from said memory for displaying a synthesized image on said monitor, a second reproducing unit responsive to a motion image frame moving instruction by said operator for reproducing said still image signal, a third writing unit for writing said same still image signal into said still image frame, a motion image frame moving unit for moving said motion image frame after said same still image signal is written, a fourth writing unit for writing said motion image signal into the moved motion image frame, a third display unit reading out a synthesized image signal of said same still image signal and said motion image signal from said memory for displaying a synthesized image on said monitor, and a recording unit responsive to a recording instruction by said operator for recording said synthesized image signal on said recording medium.

6. The digital camera according to claim 5, wherein said recording unit includes a file generating unit for generating an image file added with a predetermined identifier, and a storing unit for storing said synthesized image signal in said image file.

7. The digital camera according to claim 5, wherein said monitor also functions as a view finder.

8. A digital camera having a recording mode for recording a through image picked up through an optical system, a reproducing mode for reproducing a recorded image, and an image synthesizing mode for generating a synthesized image of the through image and the reproduced image, comprising:

a mode switching unit switching said reproducing mode and said image synthesizing mode, a display unit displaying a reproduced image when switched to a reproducing mode by said mode switching unit, a setting unit setting a through image display area on a part of a reproduced image displayed by said image display unit when switched to an image synthesizing mode by said mode switching unit, an image synthesizing unit displaying a through image at the through image display area set by said setting unit to generate said synthesized image, and a recording unit recording the synthesized image generated at said image synthesizing unit, wherein said setting unit includes a drawing unit setting two crossing points between a horizontal line and a vertical line at a part of the reproduced image displayed by said image display unit for drawing an outer frame of the through image display area, wherein said drawing unit notifies a user, when an aspect ratio of the outer frame of said through image display area attains a prescribed ratio, of attaining the prescribed ratio.

9. The digital camera according to claim 8, wherein said setting unit includes a position adjusting unit adjusting a position of the outer frame of the through image display area drawn by said drawing unit.

* * * * *